(12) United States Patent
Prevratil et al.

(10) Patent No.: US 11,740,422 B2
(45) Date of Patent: Aug. 29, 2023

(54) INTERCONNECT SYSTEM

(71) Applicant: CORNING RESEARCH & DEVELOPMENT CORPORATION, Corning, NY (US)

(72) Inventors: Karyne Poissant Prevratil, Fort Worth, TX (US); Diana Rodriguez, Fort Worth, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/729,392

(22) Filed: Apr. 26, 2022

(65) Prior Publication Data

US 2022/0252813 A1 Aug. 11, 2022

Related U.S. Application Data

(63) Continuation of application No. 17/021,636, filed on Sep. 15, 2020, now Pat. No. 11,347,013.

(60) Provisional application No. 63/031,987, filed on May 29, 2020, provisional application No. 63/018,432, filed on Apr. 30, 2020, provisional application No. 62/902,138, filed on Sep. 18, 2019.

(51) Int. Cl.
 *G02B 6/44* (2006.01)

(52) U.S. Cl.
 CPC ......... *G02B 6/4454* (2013.01); *G02B 6/4452* (2013.01); *G02B 6/4471* (2013.01)

(58) Field of Classification Search
 CPC .............................. G02B 6/4454; G02B 6/4471
 See application file for complete search history.

(56) References Cited

U.S. PATENT DOCUMENTS

| | | | |
|---|---|---|---|
| 5,946,440 A | 8/1999 | Puetz | |
| 6,209,827 B1* | 4/2001 | Kawai | F16B 21/02 248/74.3 |
| 8,554,044 B2 | 10/2013 | Bran De Leon et al. | |
| 2004/0101253 A1 | 5/2004 | Jong et al. | |
| 2010/0054686 A1 | 3/2010 | Cooke et al. | |
| 2010/0202740 A1 | 8/2010 | Barlowe et al. | |

(Continued)

FOREIGN PATENT DOCUMENTS

| | | |
|---|---|---|
| JP | 09329717 A * | 12/1997 |
| JP | 2004-138642 A | 5/2004 |

(Continued)

OTHER PUBLICATIONS

Corning Optical Splice Enclosure—RXD; Corning; Standard Recommended Procedure 003-1047-AEN, Issue 2, (2019) 12 Pages.

(Continued)

*Primary Examiner* — Charlie Y Peng
(74) *Attorney, Agent, or Firm* — Adam R. Weeks

(57) ABSTRACT

A system for managing connections for optical fibers that extend from a cable comprises a tray and a tray mount. The tray includes a body having at least one tray mount receiver. The tray mount comprises a base that defines an interface for cooperating with the at least one tray mount receiver, and comprises a clamshell tube configured to receive the optical fibers. The clamshell tube is movable between an open position and a closed position. The tray mount is configured couple the optical fibers to the tray without additional tools.

18 Claims, 14 Drawing Sheets

(56) References Cited

U.S. PATENT DOCUMENTS

2010/0215330 A1* 8/2010 Sokolowski ......... G02B 6/4471
                                                385/136
2015/0331192 A1    11/2015 Hall
2019/0072736 A1     3/2019 Glatzl et al.
2019/0204522 A1*   7/2019 Courchaine .............. H02G 3/32

FOREIGN PATENT DOCUMENTS

| WO | 2017/158447 A1 | 9/2017  |
| WO | 2018/195109 A1 | 10/2018 |
| WO | 2019/010291 A1 | 1/2019  |
| WO | 2019/079425 A1 | 4/2019  |
| WO | 2019/079460 A1 | 4/2019  |
| WO | 2020/198155 A1 | 10/2020 |

OTHER PUBLICATIONS

Corning, "Ose Splice Trays", Standard Recommended Procedure 001-285, Issue 4, Feb. 2017, pp. 1-8.
International Search Report and Written Opinion of the International Searching Authority; PCT/US2020/050839; dated Jan. 13, 2021, 13 pages; European Patent Office.

* cited by examiner

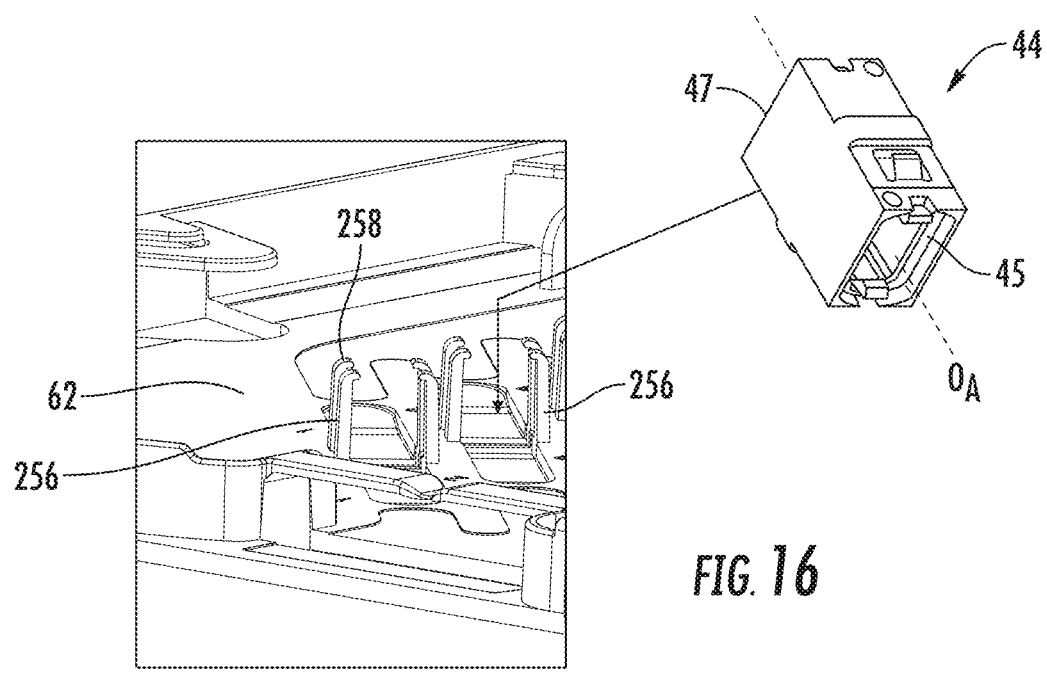
FIG. 16
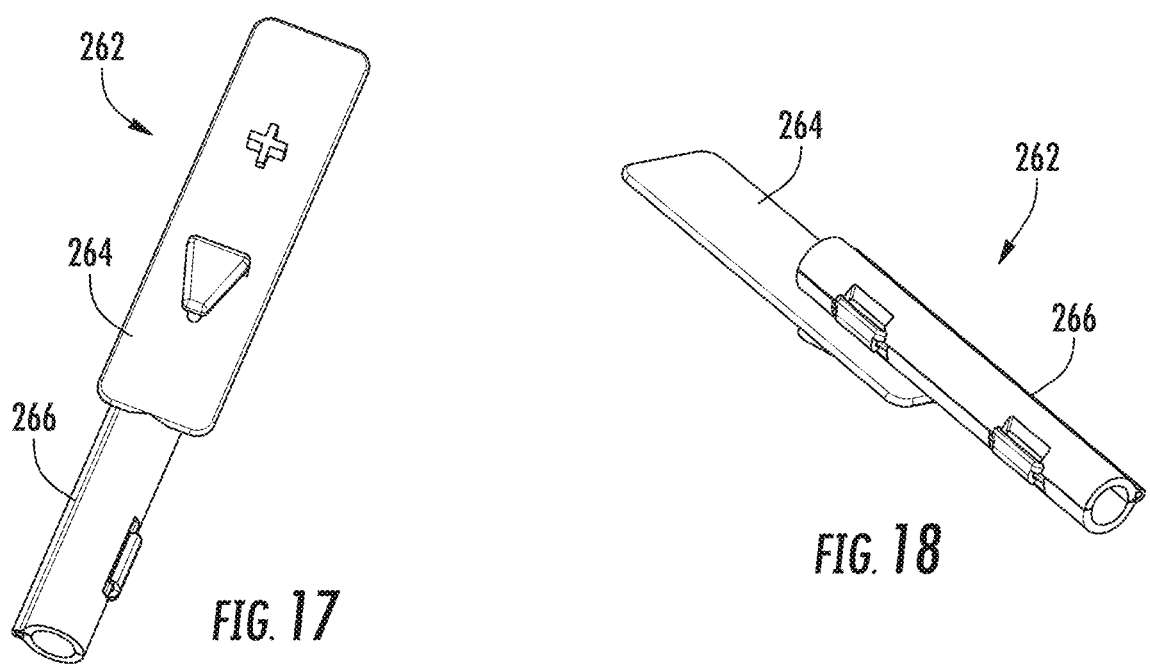
FIG. 17
FIG. 18

INTERCONNECT SYSTEM

CROSS-REFERENCE

This application is a continuation of U.S. application Ser. No. 17/021,636, filed on Sep. 15, 2020, which claims the benefit of priority to: U.S. Provisional Patent Application Ser. No. 62/902,138, filed on Sep. 18, 2019; U.S. Provisional Patent Application Ser. No. 63/018,432, filed on Apr. 30, 2020; and U.S. Provisional Patent Application Ser. No. 63/031,987, filed on May 29, 2020. The content of each of these applications is fully incorporated herein by reference.

FIELD

This disclosure relates generally to optical connectivity, and more particularly to an interconnect system having a pre-terminated cable that establishes optical interconnections with other cables in adapter trays of a cabinet. The adapter trays include features to facilitate the interconnections and/or optical fiber routing.

BACKGROUND

Large amounts of data and other information transmitted over the internet has led businesses and other organizations to develop large scale data centers for organizing, processing, storing, and/or disseminating large amounts of data. Data centers contain a wide range of communication equipment including, for example, servers, networking switches, routers, storage subsystems, etc. Data centers further include a large amount of cabling and equipment racks to organize and interconnect the communication equipment in the data center. For example, optical fiber cables and rack-mounted hardware to support optical connections are used extensively in data centers. Optical fibers can support very high bandwidths with lower signal loss compared to traditional data transmission mediums (e.g., copper wires).

The connections between communication equipment in large-scale data centers is typically not confined to a single building. May modern data centers include multi-building campuses having, for example, one primary or main building and a number of auxiliary buildings in close proximity to the main building. All the buildings on the campus are interconnected by a local fiber optic network. More particularly, each of the auxiliary buildings are typically connected to the main building by one or more high fiber-count optical cables referred to as "trunk cables". Each trunk cable may include thousands of optical fibers. Indeed, fiber counts of 3,456 or higher are now common.

To provide optical connectivity within a building, the optical fibers of a trunk cable are typically spliced to optical fibers of indoor distribution cables. The splices may be stored and organized in a splice cabinet from which the indoor distribution cables extend. More specifically, the splice cabinet holds numerous splice trays that each receives a group of optical fibers from the trunk cable that have been spliced to a group of optical fibers associated with the indoor distribution cables. Fusion splicing is commonly used as the primary technique for splicing the two groups of optical fibers together before the splices are stored and organized in the splice trays. The indoor distribution cables exit the splice cabinet and extend to desired locations within the building, such as to designated rows of equipment racks. Connections to the communication equipment in the equipment racks are ultimately made by the indoor distribution cables or cables that are part of a structured cabling system for the building.

The amount of labor and time for connecting a trunk cable to the communication equipment in the main building on a data center campus is significant. In a typical installation process, it may take two technicians approximately two weeks to fusion splice the optical fibers of a trunk cable to corresponding internal optical fibers of the main building. Additionally, fusion splicing is a labor-intensive method for connecting optical fibers that is typically performed under field conditions, as opposed to under more highly controlled factory conditions. Thus, the quality of the splicing and the attenuation of the optical signal through the splice may vary widely depending on the field technicians' skill and experience.

Furthermore, the optical fibers from the trunk cable and the internal optical fibers are typically coupled to the splice tray by a cinch in order to keep the optical fibers organized at or within the tray. For example, in a conventional approach a zip tie or other suitable cable tie wraps around a portion of the tray and the optical fibers to secure and maintain control of the optical fibers entering/exiting the splice tray. In some cases, the field technicians that install the trunk cables in the splice cabinets overtighten the cinches and thereby degrade the optical signals at the pinch point of the cinches. A simplified, more uniform approach is therefore desired.

SUMMARY

Embodiments of adapter trays ("trays") and interconnect systems including such trays are provided in this disclosure. The interconnect systems may involve high fiber-count cables that carry many optical fiber ribbons, with the trays being used to establish interconnections to the optical fiber ribbons, which may be pre-terminated.

For example, according to one embodiment, an interconnect system for a building includes a pre-terminated trunk cable assembly configured to extend into the building, a cabinet, and a plurality of trays disposed within the cabinet for managing interconnections within the building. The pre-terminated trunk cable assembly comprises a cable jacket, a plurality of subunits within the cable jacket, and a furcation body associated with a first end of the cable jacket. Each subunit includes a subunit jacket and different groups of optical fibers carried within the subunit jacket. The "different groups" refers to distinct groupings of the optical fibers, but the groupings themselves may be the same in terms of number of optical fibers, type of optical fibers, etc. Each of the different groups may comprise an optical fiber ribbon, for example. Additionally, each subunit of the plurality of subunits includes an end section extending from the furcation body and the first end of the cable jacket. Each of the end sections includes the different groups of optical fibers of the associated subunit extending from the associated subunit jacket. The pre-terminated trunk cable assembly also includes a plurality of ferrules each respectively terminating one or more groups of the different groups of optical fibers. Each tray of the plurality of trays includes a body and a plurality of adapters disposed on the body for receiving the plurality of ferrules. The body includes an inlet end for receiving a select subunit of the plurality of subunits, and the inlet end has at least one tray mount receiver. A plurality of tray mounts are configured to be assembled on the plurality of subunits. Each tray mount of the plurality of tray mounts includes an interface for cooperating with the at least one tray mount receiver so that that the tray mount can couple the select subunit to a corresponding tray of the plurality of trays without additional tools.

In some embodiments, the plurality of adapters on the tray body are arranged adjacent to each other in a direction along the longitudinal axis. Each adapter of the plurality of adapters includes a first opening, a second opening opposite the first opening, and an optical axis extending between the first opening and the second opening. Each adapter is arranged such that the optical axis is non-perpendicular to the longitudinal axis of the corresponding tray. And for each tray of the plurality of trays, the different groups of optical fibers of the select subunit each extend from the inlet end to the distal end, curve at the distal end so as to extend back toward the inlet end, form a loop to extend back toward the distal end, and then curve back toward the inlet end before extending to a corresponding adapter of the plurality adapters. Adapter/fiber routing arrangements like are possible in embodiments with or without tray mount receivers on the trays and tray mounts assembled on the subunits.

Additional features and advantages will be set out in the description that follows, and in part will be readily apparent to those skilled in the technical field of optical connectivity.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 16 is a perspective view of a portion of the tray shown in FIG. 14, illustrating how the tray is configured to receive fiber optic adapters.

FIG. 17 is a bottom perspective view of a tray mount for a subunit of a trunk cable according to an embodiment of this disclosure.

FIG. 18 is a top perspective view of the tray mount shown in FIG. 17, illustrating the tray mount in a closed position.

DETAILED DESCRIPTION

Various embodiments will be clarified by examples in the description below. In general, the description relates to trays for managing interconnections between two cables that each include optical fibers terminated by ferrules (e.g., as part of optical connectors or as standalone components not part of optical connectors). The trays are particularly suited for interconnect systems where one of the cables is a high fiber-count trunk cable configured to extend into a building (e.g., of a data center), and the other cable is an indoor distribution cable for the building. The trays may facilitate organizing and supporting the cables and their associated interconnections such that a large number of the interconnections can be easily established, managed, and ultimately stored in a confined space, such as within a cabinet.

To facilitate discussion and provide context, an exemplary environment and use for high fiber-count cables will first be described. A description of an example pre-terminated cable assembly that uses a high fiber-count cable will then follow. Finally, example interconnect systems and methods will be described, with such systems and methods involving trays for managing interconnections to the example pre-terminated cable assembly.

Example Environment (Data Center Cable Network)

Figure 1:
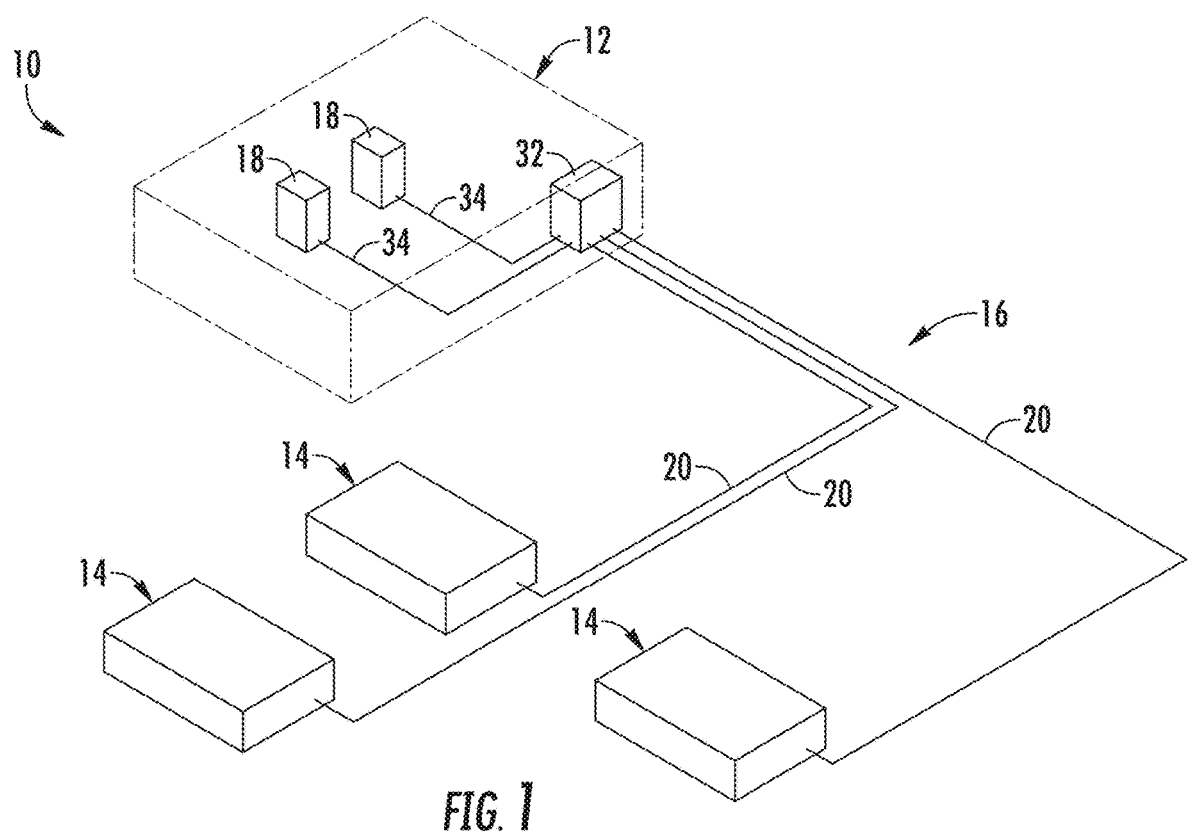
FIG. 1 is a schematic illustration of a data center campus interconnected according to an exemplary embodiment of the disclosure.

As illustrated in FIG. 1, a modern-day data center 10 may include a collection of buildings (referred to as a data center campus) having, for example, a main building 12 and one or more auxiliary buildings 14 in close proximity to the main building 12. While three auxiliary buildings are shown, there may be more or less depending on the size of the campus. The data center 10 provides for a local fiber optic network 16 that interconnects the auxiliary buildings 14 with the main building 12. The local fiber optic network 16 allows communication equipment 18 in the main building 12 to communicate with various communication equipment (not shown) in the auxiliary buildings 14. In the exemplary embodiment shown, the local fiber optic network 16 includes trunk cables 20 extending between the main building 12 and each of the auxiliary buildings 14.

The trunk cables 20 may be similar to any of the cables described in International Patent Application Publication No. WO 2019/010291 A1 ("the '291 publication"), the disclosure of which is fully incorporated herein by reference. Thus, although a brief description of one of the trunk cables 20 is provided below to introduce aspects related to this disclosure, reference can be made to the '291 publication for an understanding of other aspects and variations.

Figure 2:
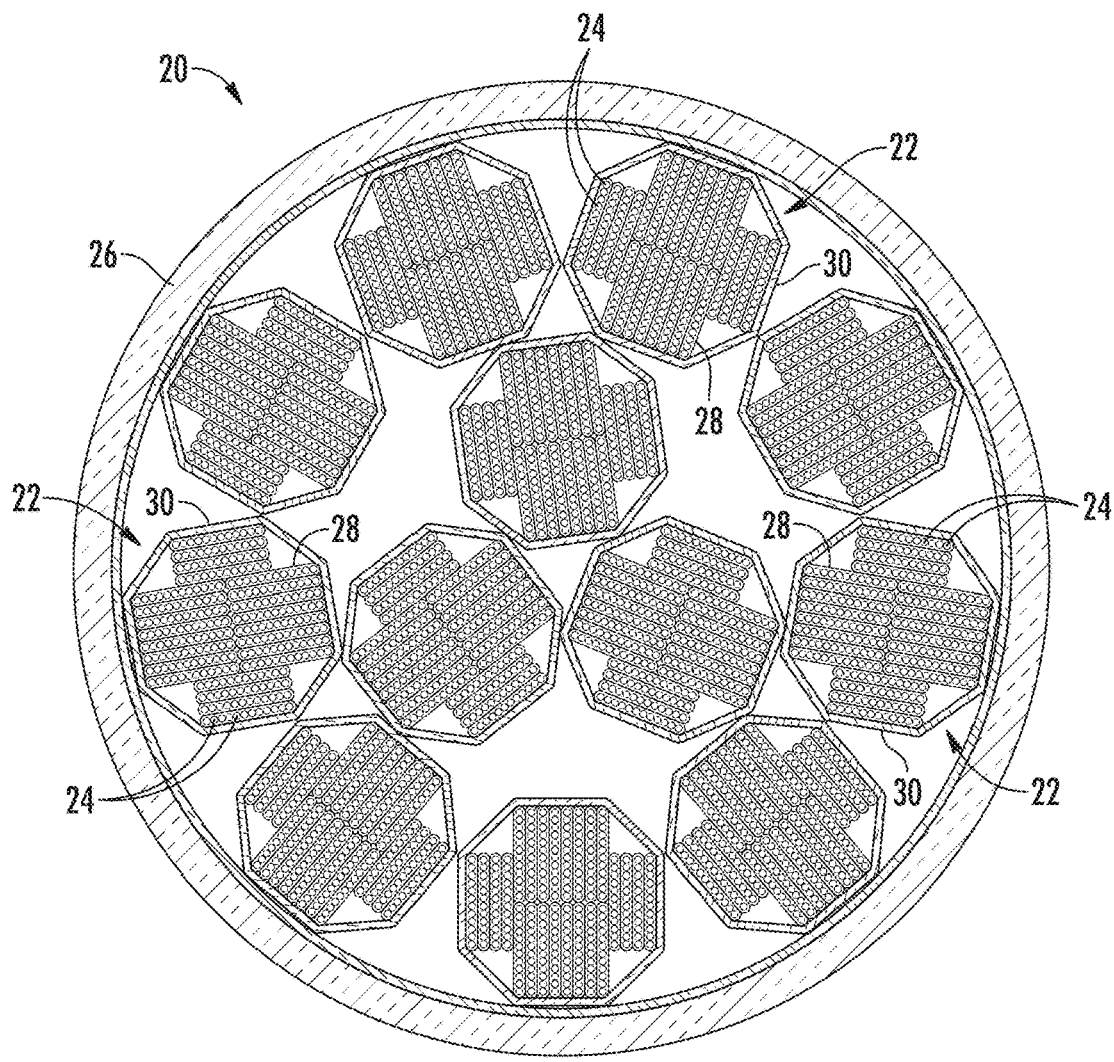
FIG. 2 is a cross-sectional view of one example of a trunk cable used in the data center campus of FIG. 1 to interconnect buildings.

As illustrated in FIG. 2, an example one of the trunk cables 20 generally includes a high fiber-count arrangement of optical fibers 24 (e.g., 3,456 or more optical fibers) for passing data and other information through the local fiber optic network 16. The trunk cable 20 includes a plurality of subunits 22, and each subunit 22 is configured to carry a pre-selected number of optical fibers 24. Although the trunk cable 20 is shown as including twelve subunits 22, the number of subunits 22 may be more or less than this number in alternative embodiments. The subunits 22 may be arranged within an outer protective sheath 26 (also referred to as "outer cable jacket 26" or simply "cable jacket 26" or "outer jacket 26"), as is generally known in the industry. As mentioned above, each of the subunits 22 is configured to carry a pre-selected number of optical fibers 24. By way of example and without limitation, each subunit 22 may be configured to carry 144 or 288 optical fibers 24. It should be recognized, however, that more or less optical fibers 24 may be carried by each of the subunits 22.

The optical fibers 24 in the subunits 22 may be arranged in different groups (i.e., distinct groupings, even though the groupings may have the same number of optical fibers 24). As an example, the optical fibers 24 may be configured as a plurality of optical fiber ribbons 28 ("ribbons 28"). Each ribbon 28 includes a plurality of the optical fibers 24 arranged in a generally side-by-side manner (e.g., a linear array, as shown, or a rolled/folded array). Such ribbons are generally known and thus will not be described further in this disclosure. Each ribbon 28 may include, for example, eight, twelve, sixteen, or any other number of the optical fibers 24. The ribbons 28 of a subunit 22 may be arranged within a subunit sheath 30 ("subunit jacket 30"), which may be a thin layer of material that has been extruded over the ribbons 28.

In the example illustrated in FIG. 2, the trunk cables 20 from the auxiliary buildings 14 are routed to a distribution cabinet 32 (also referred to as "distribution enclosure 32") housed in the main building 12. In alternative embodiments, there may be multiple distribution cabinets 32 in the main building for receiving the trunk cables 20. Thus, there may be one or more distribution cabinets 32.

Figure 3:
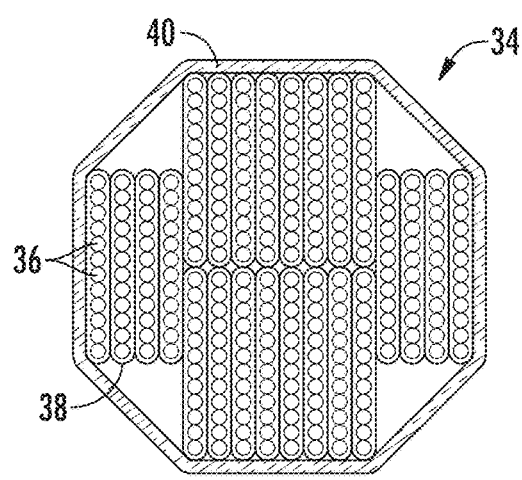
FIG. 3 is a cross-sectional view of one example of an indoor cable used within buildings of the data center campus shown in FIG. 1.

Within the main building 12, a plurality of indoor fiber optic cables 34 ("indoor cables 34") are routed between the communication equipment 18 and the one or more distribution cabinets 32. In an exemplary embodiment and as illustrated in FIG. 3, each of the indoor cables 34 may be configured similar to the subunits 22, at least in terms of fiber count and fiber groupings, and thereby be configured to carry a pre-selected number of optical fibers 36. By way of example and without limitation, each indoor cable 34 may be configured to carry 144 or 288 of the optical fibers 36. It should be recognized, however, that more or less optical fibers 36 may be carried by each of the indoor cables 34.

Similar to the optical fibers 24 of the subunits 22, the optical fibers 36 in the indoor cables 34 may be configured as a plurality of optical fiber ribbons 38 ("ribbons 38"). Thus, each ribbon 38 may include a plurality of optical fibers 36 arranged in a generally side-by-side manner (e.g., in a linear array or in a rolled/folded array). Again, such ribbons 38 are generally known in and thus will not be described further in this disclosure. Each ribbon 38 may include, for example, eight, twelve, sixteen, or any other number of the optical fibers 36. The ribbons 38 of an indoor cable 34 may be arranged within an outer protective sheath 40 (also referred to as "cable outer jacket 40" or simply "cable jacket 40"), as is generally known in the industry.

Figure 4:
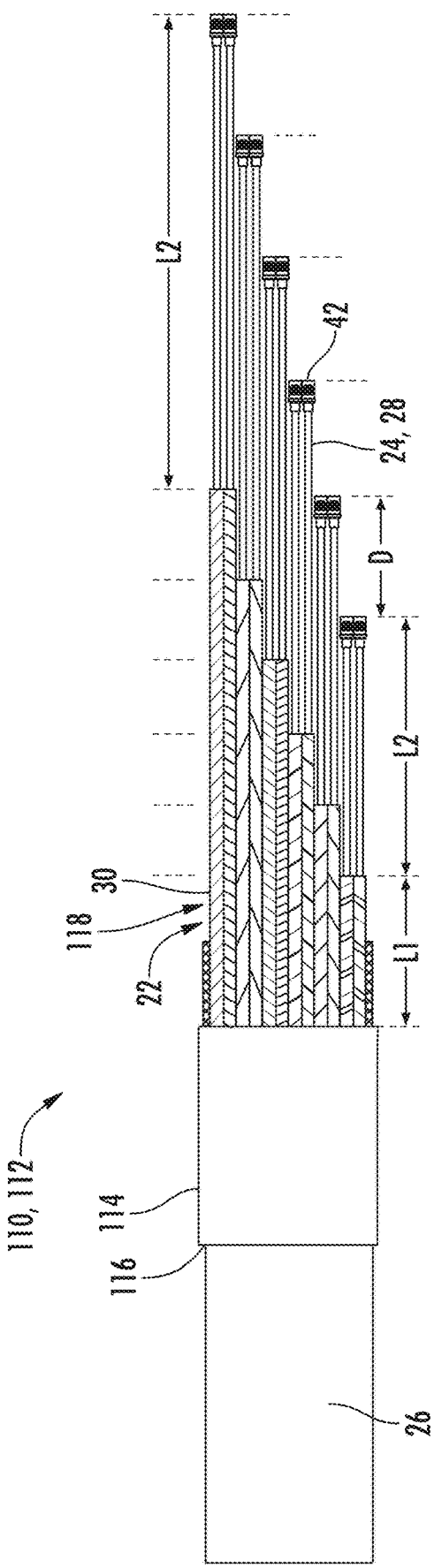
FIG. 4 is a schematic view of an end portion of the trunk cable of FIG. 2 having subunits pre-terminated with ferrules.

Although only the interior of the main building 12 is schematically shown in FIG. 4 and discussed above, each of the auxiliary buildings 14 may house similar equipment for similar purposes. Thus, although not shown, each of the trunk cables 20 may be routed to one or more distribution cabinets 32 in one of the auxiliary buildings 14 in a manner similar to that described above. Furthermore, each of the auxiliary buildings 14 may include indoor cables 34 that extend between communication equipment 18 and the one or more distribution cabinets 32 of the auxiliary building 14.

Example Pre-Terminated Cable Assembly

In accordance with an aspect of this disclosure, at least one of the trunk cables 20 extending between buildings 12, 14 and at least some of the indoor cables 34 within the buildings 12, 14 may be pre-terminated. That is, at least one of the trunk cables 20 has at least one end where the optical fibers 24 of that that trunk cable 20 are terminated by a connection interface prior to being sent out into the field for installation in the local fiber optic network 16. Likewise, at least some of the indoor cables 34 (e.g., those intended to be coupled to the subunits 22 of the trunk cable(s) 20 that are pre-terminated) have at least one end where the optical fibers 36 are terminated by a connection interface prior to being sent out into the field for installation in the local fiber optic network 16. The terminations of the trunk cable(s) 20 and indoor cables 34 may instead occur during their respective manufacture (i.e., as part of a cable assembly manufacturing process). Thus, the word "pre-terminated" is used in this disclosure to refer to terminations that take place by the manufacturer of resulting cable assembly, prior to deployment to customers, customer sites, etc. ("the field").

As used in this disclosure, "connection interface" refers to an optical connector, optical connector sub-assembly, or one or more optical connector components, such as ferrules, that facilitate coupling of the optical fibers on which they are installed to other optical fibers that are terminated with a same or different connector interface. In one embodiment, for example, the trunk cables 20 may be pre-terminated with a plurality of ferrules. Each ribbon 28 may be terminated with a respective ferrule, such as 12-fiber ribbons each being terminated with a respective 12-fiber MT ferrule. Alternatively, groups of two or more ribbons 28 may be terminated with the same ferrule, such as groups of two 12-fiber ribbons each being terminated with a respective 24-fiber MT ferrule. There does not need to be a connector housing (also referred to simply as a "housing", or as "connector body" or simply "body") receiving the ferrule. It may just be the ferrule terminating the group(s) of optical fibers, or just the ferrule and components other than a connector housing such that the connection interface itself is something less than an optical connector. As is known in the industry, optical connectors are designed provide two primary functions: alignment of optical fibers for optical coupling, and mechanical retention to maintain that alignment. A ferrule is typically the primary component for optical alignment purposes, and the connector housing is typically the primary component for retention purposes since it typically includes a coupling mechanism (e.g., a latch feature for cooperating with a complementary latching feature of an adapter).

FIG. 4 schematically illustrates an end portion 112 of one of the trunk cables 20 pre-terminated with a plurality of the ferrules 42 to form a pre-terminated trunk cable 110. The termination involves not only the installation of ferrules 42, but also preparing the end portion 112 of the trunk cable 20 for such installation. To this end, the pre-terminated trunk cable 110 includes a furcation body 114 associated with a first end 116 of the cable jacket 26. For example, the furcation body 114 may be installed on the first end 116 such that the cable jacket 26 ends within the furcation body 114. The furcation body 114 represents a "breakout", "branching", or "fanout" point on the trunk cable, as end sections 118 of the subunits 22 extend from the furcation body 114 and beyond the first end 116 of the cable jacket 26 so that the subunits 22 have more freedom to spread out. Various types of furcation bodies are known. In the embodiment shown, the furcation body 114 comprises a shell positioned on or near the first end 116 of the cable jacket 26 and polymer material filling the shell. The polymer material may be a cured adhesive, such as epoxy, so that the shell is secured to the cable jacket 26 and the subunit jackets 30. In alternative embodiments, the furcation body 114 may have a different construction and/or be secured to the trunk cable 20 in a different manner.

Figure 5:
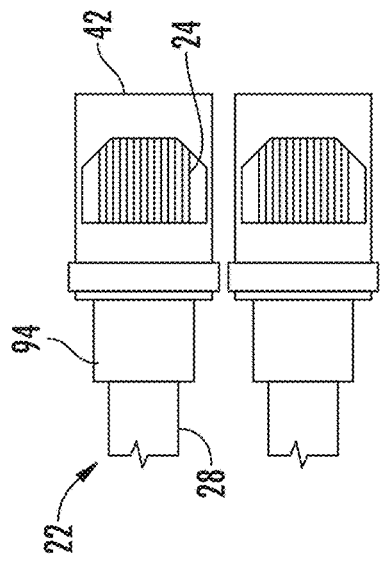
FIG. 5 is a close-up schematic view of the ferrules associated with two of the subunits in FIG. 4.

In the embodiment shown in FIG. 4, the end sections 118 of the subunits 22 each include the associated subunit jacket 30 extending a certain length from the furcation body 114, and the associated group of optical fibers 24 extending a certain length from (i.e., beyond) the associated subunit jacket 30. For convenience, only a representative ribbon 28 and representative ferrule 42 is schematically shown for each subunit 22 in FIG. 4. A close-up of the representative ribbon 28 and representative ferrule 42 for two of the subunits 22 is schematically shown in FIG. 5. As mentioned above, each subunit 22 may actually include a plurality of ribbons 28, such as twelve ribbons 28 that each have twelve optical fibers 24 (144 fiber count per subunit 22), twenty-four ribbons 28 that each have twelve optical fibers 24 (288 fiber count per subunit 22), or the like.

Referring back to FIG. 4, the end sections 118 of the subunits 22 are grouped in pairs, with the end sections 118 of a given pair having substantially the same length. For example, the lowermost pair in FIG. 4 includes the subunit jackets 30 extending a length L1 from the furcation body 114, and the optical fibers 24 extending a length L2 from the subunit jacket 30. The total length of the end section 118 (i.e., L1+L2) may be referred to as the "leg length". The different pairs of end sections 118 have different leg lengths to provide a staggered arrangement of the ferrules 42. This staggering allows the pre-terminated trunk cable 110 to be placed within a smaller pulling grip/sock (compared to if there were no staggering), and therefore, fit within smaller ducts or the like.

In FIG. 4, each successive group of end sections 118 has a leg length that is a distance D longer than the leg length of the preceding group. Thus, each group of end sections 118 is D longer than the previous group such that there is substantially uniform (i.e., uniform or intended to be uniform) staggering of the different groups of the ferrules 42. In alternative embodiments, the staggering may be non-uniform. The different leg lengths may be due to the subunit jackets 30 extending further from the furcation body 114. Thus, the length L2 that the optical fibers 24 extend beyond the corresponding subunit jacket 30 may remain substantially the same (i.e., the same or intended to be the same). A consistent length of exposed ribbons 28 may allow consistent processing by the manufacturer of the pre-terminated trunk cable 110 when terminating the optical fibers 24. In other words, termination processes may be based on a certain exposed length of each ribbon 28 (e.g., for fixtures, stripping equipment, etc.). When that length is provided, the termination processes may be performed in a repeatable manner. Alternative embodiments without consistent lengths of exposed ribbons 28 are nevertheless within the scope of this disclosure as well.

Figure 6:
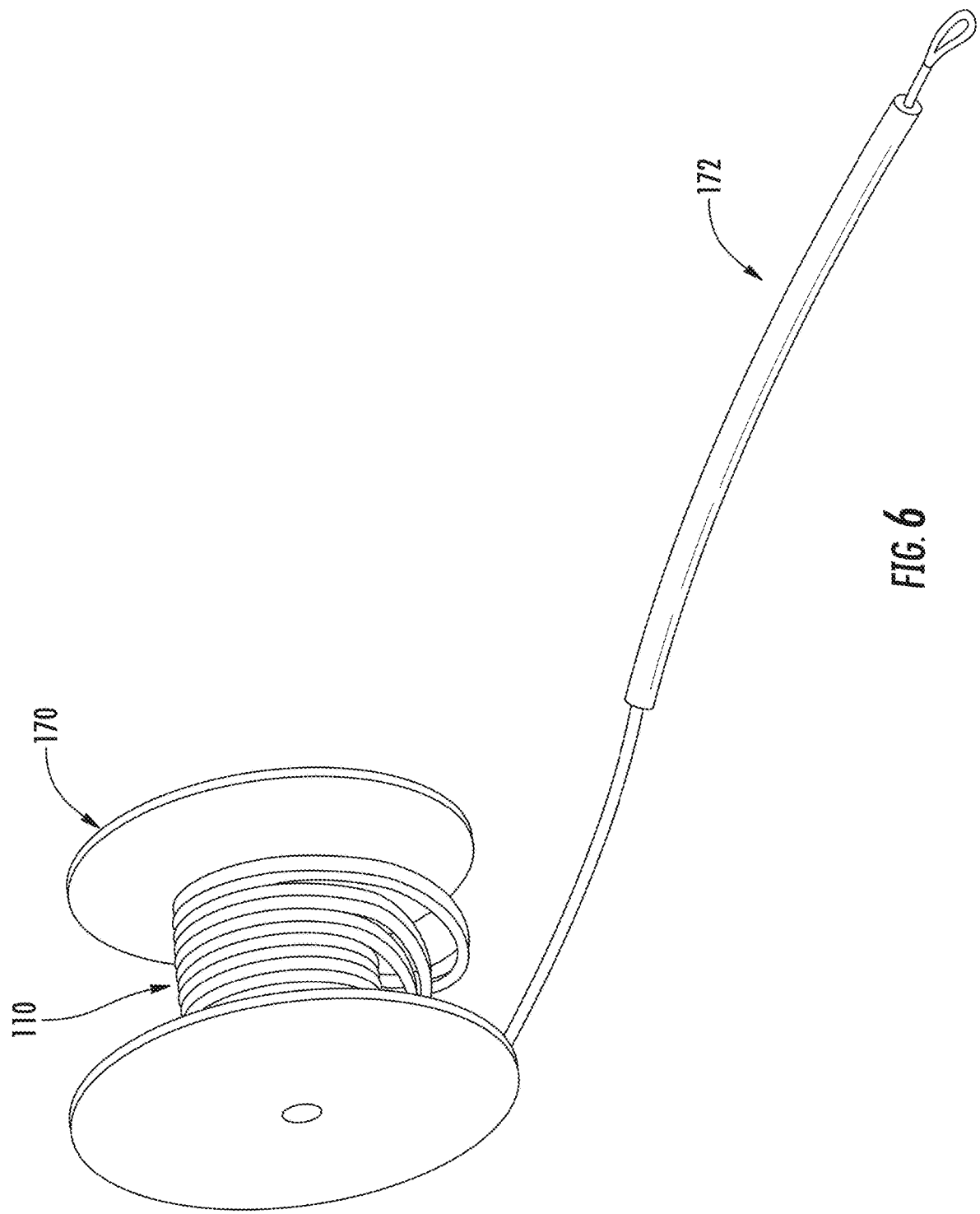
FIG. 6 is a perspective of the trunk cable of FIG. 2 stored on a cable reel and a pulling grip assembly ("pulling grip") covering the end portion of the trunk cable of FIG. 4.
Figure 7:
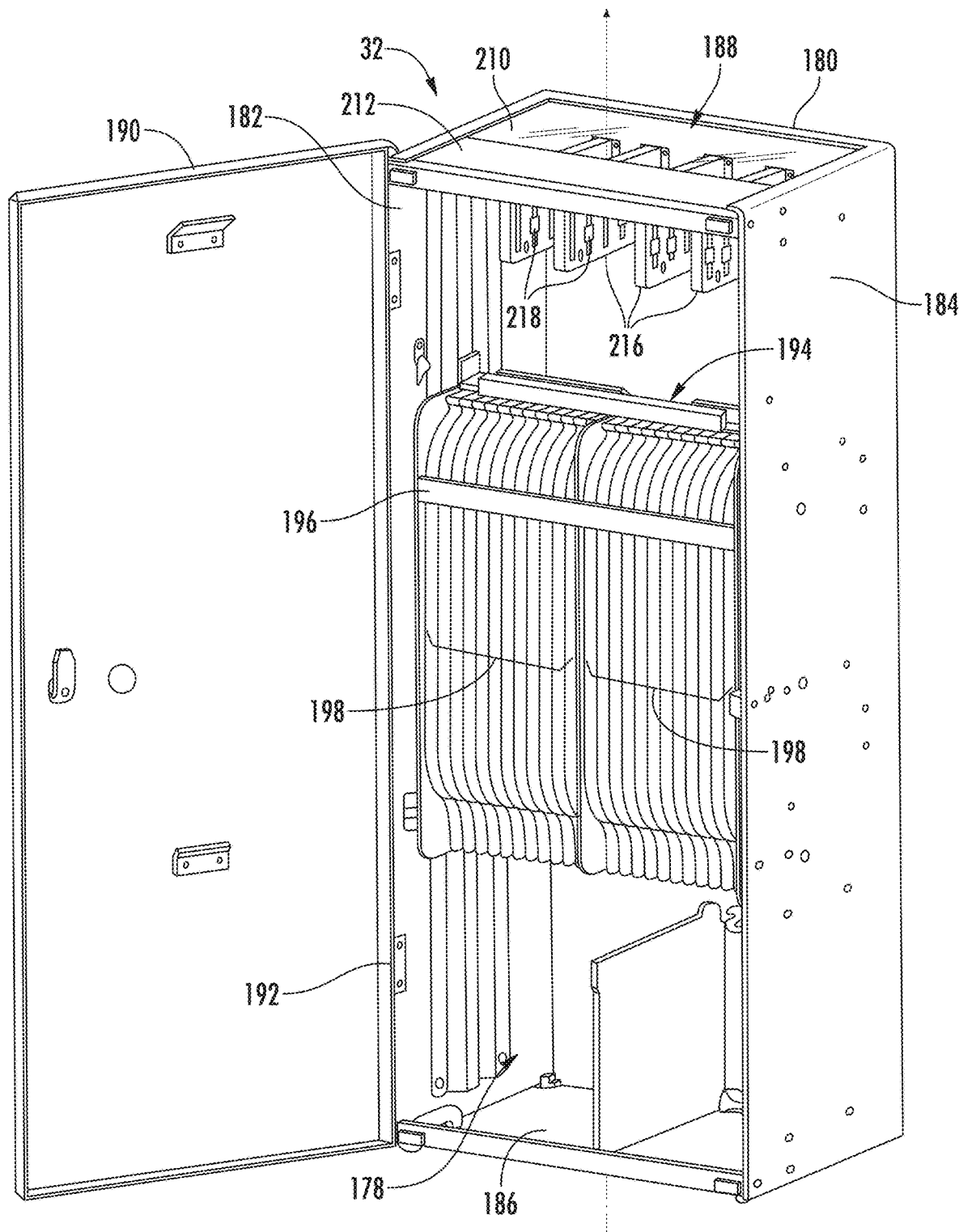
FIG. 7 is a perspective view of one example of a distribution cabinet used in the data center campus of FIG. 1.

FIG. 6 illustrates the pre-terminated trunk cable 110 on a reel 170 and an example of a pulling grip assembly 172 (also referred to as "pulling grip 172" or "pulling sock 170") installed over an end portion of the pre-terminated trunk cable 110 (e.g., the end portion 112 represented in FIG. 7). The pulling grip 172 covers all of the ferrules 42 associated with the end portion 112. It has already been mentioned how the staggering of the ferrules 42 can help minimize the footprint of the pulling grip 172. For a given pulling grip design, the maximum width/diameter can be less than what it would need to be to accommodate the trunk cable 20 being pre-terminated with assemblies considered to be optical connectors. Additional details of the pulling grip 172 need not be discussed for the purpose of this disclosure. FIG. 6 is merely provided for context to show how the pre-terminated trunk cable 80 may be delivered to an intended site of installation, such as the data center 10 (FIG. 1). At the site of installation, the pre-terminated trunk cable 110 is ultimately installed and used as part of an interconnect system. An example installation of such an interconnect system for the data center 10 will now be described.

Example Interconnect System

FIG. 7 illustrates one possible embodiment for the distribution cabinets 32 mentioned above in connection with FIG. 4. The distribution cabinet 32 may be similar to embodiments described in PCT Patent Application Publication Nos. WO 2019/079460 A1 ("the '460 publication") and WO 2019/079425 A1 ("the '425 publication"), the disclosures of which of fully incorporated herein by reference. Indeed, FIG. 7 generally corresponds to FIG. 1 of the '425 publication such that reference can be made to the '425 publication for a more complete understanding of aspects not discussed below. Only a brief overview is provided below before focusing on differences from the '425 publication that are specific to this disclosure.

As shown in FIG. 7, the distribution cabinet 32 includes various walls that are assembled together to define an interior volume 178. In particular, the distribution cabinet 32 includes a rear wall 180, a first side wall 182 and a second side wall 184 coupled to opposite sides of the rear wall 180, and a lower wall 186 and an upper wall 188 respectively coupled to a top and bottom of each of the rear wall 180, the first side wall 182, and the second side wall 184. A front door 190 is pivotally coupled to the first side wall 182 (e.g., by hinges 192) to provide selective access to the interior volume 178. The distribution cabinet 32 also includes a tray assembly 194 within the interior volume 178 that comprises a tray housing 196 (or "carriage 196") pivotally coupled to the distribution cabinet 32 and a plurality of trays 198 coupled to the tray housing 196. The tray housing 196 may pivot/rotate outward from the interior volume 178 to facilitate access to the trays 198. The trays 198 themselves may pivot or otherwise move relative to the tray housing 196 (including being removable from the tray housing 196) to provide additional access to any given tray 198.

The '425 publication refers to the trays 198 as "splice trays" because they are intended to store fusion splice joints between the optical fibers of two different cables. Because the present disclosure relates to pre-terminated cables rather than ones that require splicing, the more generic term "distribution tray" or simply "tray" is used. The trays 198 are still intended to store joints between the optical fibers of two different cables, but the joints are in the form connection interfaces that are mated (i.e., coupled) together using respective adapters. The trays 198 may therefore be referred to as "adapter trays 198" or "patch trays 198" and the distribution cabinet 32 as a "patch cabinet 32" or "patch enclosure 32".

Figure 8A:
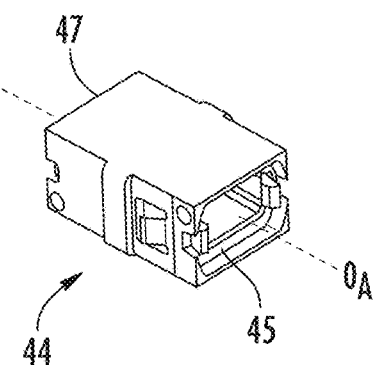
FIG. 8A is a close-up perspective view of an adapter used on the tray of FIG. 8 to establish optical connections.
Figure 8:
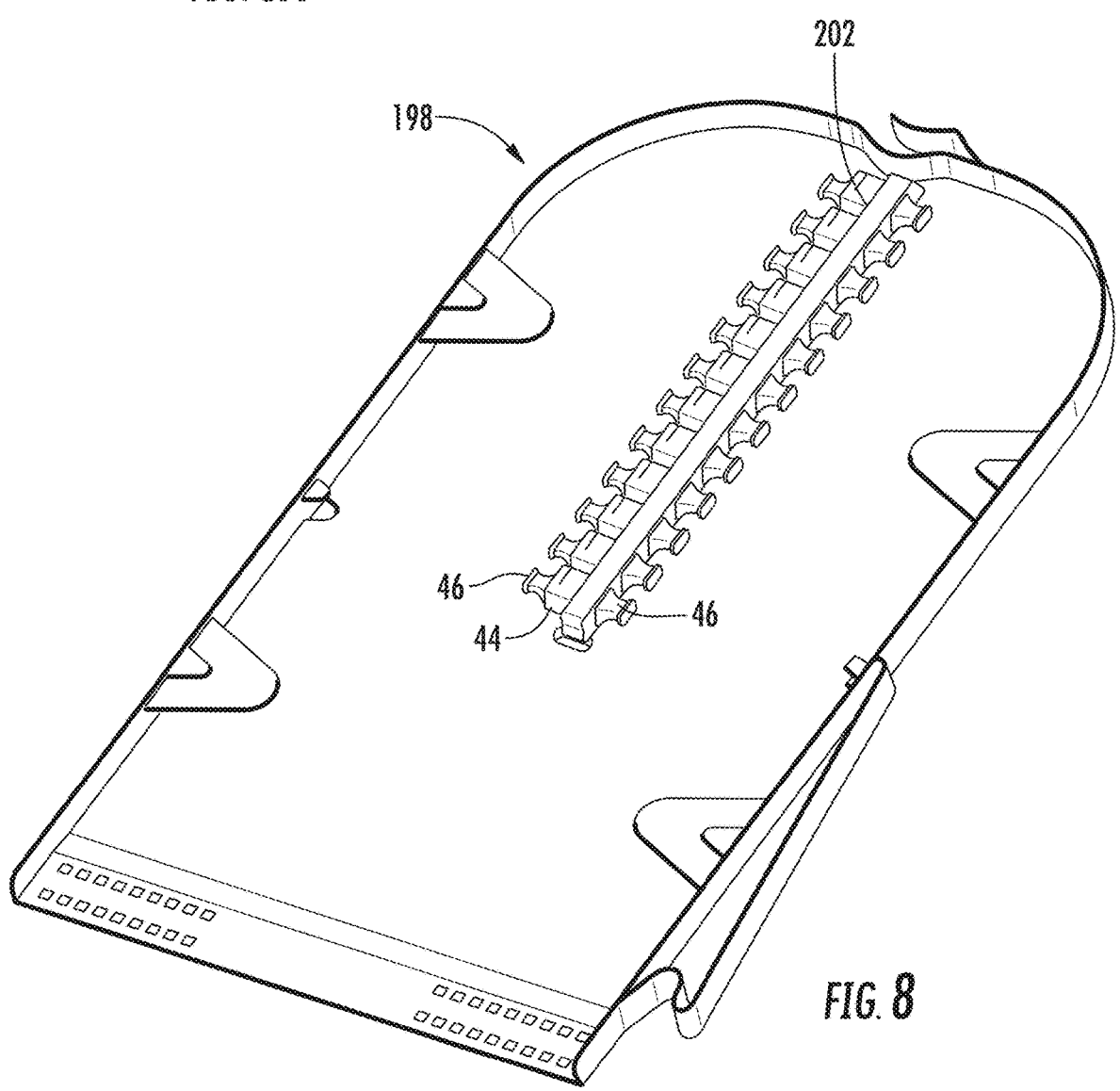
FIG. 8 is a perspective view of one example of a tray that is used to store optical connections in the distribution cabinet of FIG. 7.

FIG. 8 illustrates a possible embodiment for a representative one of the trays 198. As shown in FIG. 8, the tray 198 includes a series or bank of the adapters 44 coupled to the tray 198. Any common grouping and mounting of the adapters 44 may be considered as an adapter panel for the purpose of this disclosure. In the embodiment of FIG. 8, the adapters 44 are commonly mounted in a support 202 that, in turn, is mounted to the tray 198. The support 202 with the adapters 44 may be considered as an adapter panel, or more generally the tray 198 assembled with the adapters 44 may be considered as an adapter panel. Indeed, in alternative embodiments, the adapters 44 may be mounted to the tray 198 individually instead of by way of a common support. Embodiments of "ganged" adapters (not shown) mounted to the tray 198 are also possible.

FIG. 8 illustrates the adapters 44 in the form of MPO-type adapters (e.g., according to IEC 61754-7-2: 2019 or TIA/EIA 604-5-F: 2019) for convenience, with dust plugs/covers 46 on opposite sides of the adapters 44. This can best be appreciated from FIG. 8A, which is a close-up view of an example adapter 44. Thus, the connection interfaces on the cables intended to be mated using the adapter 44 (e.g., the trunk cable 20 and an indoor cable 34 in FIG. 1) may be MPO-type connectors (not shown). MPO adapters and connectors are well-known in the industry and need not be described in further detail. It is known, for example, how a pair of mating MPO connectors and the associated adapter used for that mating collectively form a connection joint between different groups of optical fibers.

Other embodiments of the tray 198 may include other standard or non-standard types of adapters. For example, embodiments will be described below in connection with FIGS. 9-12 for mating MT ferrules that are not part of MPO connectors. These types of adapters are therefore particularly suited for the pre-terminated trunk cable 110 described above. Embodiments are also possible involving adapters configured to mate two different connection interfaces, such as mating an MPO connector to just an MT ferrule or to a sub-assembly that includes an MT ferrule (with the sub-assembly not being an optical connector). One example of such an adapter is shown in U.S. Patent Application Pub. No. 2004/0101253, and another schematic example of such an adapter is provided later in this disclosure in connection with FIG. 13. These types of adapters are also particularly suited for the pre-terminated trunk cable 110 described above.

As can be appreciated, the type of adapter used on the tray 198 depends on the type of connection interface of the cables to be interconnected. Thus, although the remainder of this section will refer to the tray 198 and adapters 44 being used with the pre-terminated trunk cable 110, this is merely to facilitate discussion. Together, the trunk cable 20 that has been pre-terminated with connection interfaces and the distribution cabinet 32 with its adapter panels (e.g., trays 198) define an interconnect system. This section merely introduces the general principles of such an interconnect system.

With this in mind, and now referring collectively to FIGS. 1 and 5-7, the pre-terminated trunk cable 110 may be routed from one building (main building 12 or auxiliary building 14) to another in the data center 10. This may involve using the pulling grip 172 to pull the pre-terminated trunk cable 110 through ducts that extend into and out of the buildings, and possibly between the buildings. Ultimately the end portion 112 that includes the pulling grip 172 may be routed into the interior volume 178 of the distribution cabinet 32. Various features may be provided in the distribution cabinet 32 to assist with receiving the pre-terminated trunk cable 110. Although FIG. 7 illustrates a transparent rear plate 210 without openings as a rear portion of the upper wall 188, such a plate may include different sized openings for different types of cables. For example, there may be openings sized to receive the larger, high fiber-count pre-terminated trunk cables 110, and openings sized to receive the relative smaller fiber-count indoor cables 34. A front plate 212 defining a front portion of the upper wall 188 may also be removable to assist with accessing the pre-terminated trunk cable 110 and other cables as they are routed into the distribution cabinet 32 (e.g., through the openings in the rear plate 210, if present). Additionally, the distribution cabinet 32 may include brackets 216 below the rear plate 210 that serve as mounting locations for the pre-terminated trunk cable 110 and other cables. Apertures 218 or other mounting features may be provided on the brackets 216 for cooperating with complementary mounting features of clips (not shown), which may be integral with the cables (e.g., part of the furcation body 114) or mounted to the cables.

Ultimately the pulling grip 172 is removed from the pre-terminated trunk cable 110 to expose the end sections 118 (FIG. 5) of the subunits 22. This may be done before or after securing the pre-terminated trunk cable 110 to the brackets 216. Regardless, having routed the end portion 112 into the distribution cabinet 32 using the pulling grip 172, the end sections 118 of the subunits 22 are positioned close the trays 198. This may help minimize the amount of further routing or handling of the pre-terminated trunk cable 110 after the pulling grip 172 is removed, thereby reducing the potential for damage that results from sections of the ribbons 28 now being exposed (the end portions of the optical fibers 24 that extend from the associated subunit jackets 26).

The connection of each subunit 28 of the pre-terminated trunk cable 110 to the corresponding indoor cable 34 generally takes place in a corresponding one of the trays 198. For example, FIG. 8 may represent the tray 198 associated with the connection between one of the subunits 22 and a corresponding indoor cable 34. When it is desired to make that connection, the tray 198 is accessed from the tray assembly 194. Each connection interface of the subunit 22 (described above as being only ferrules 42, but could be complete MPO connectors) may be inserted into a corresponding one of the adapters 44 after removing one of the dust plugs 46 from the adapter 44. Similarly, each connection interface (possibly a complete MPO connector that includes a ferrule 42) of the indoor cable 34 is inserted into an opposite side of a corresponding one of the adapters 44 after removing the other dust plug 46 of the adapter 44. By this time the indoor cable 34 has been routed into the distribution cabinet 32 in a manner similar to the pre-terminated trunk cable 80. The adapters 44 align and hold the connection interfaces together to allow light to travel between the optical fibers 24 of the subunit 22 and the optical fibers 36 of the indoor cable 24. The tray 198 including the adapters 44 may then be moved back to a storage position in the tray housing 196, and the process repeated for a different subunit 22, tray 198, and indoor cable 34.

Alternative Tray Designs

Now that the concept of the interconnect system has been generally introduced, the specific embodiments alluded to above will be described. As mentioned above, these embodiments involve trays with adapters configured to receive MT ferrules that are not part of MPO connectors and, therefore, are particularly suited for the pre-terminated trunk cable 110 and similar pre-terminated trunk cables.

Figure 9:
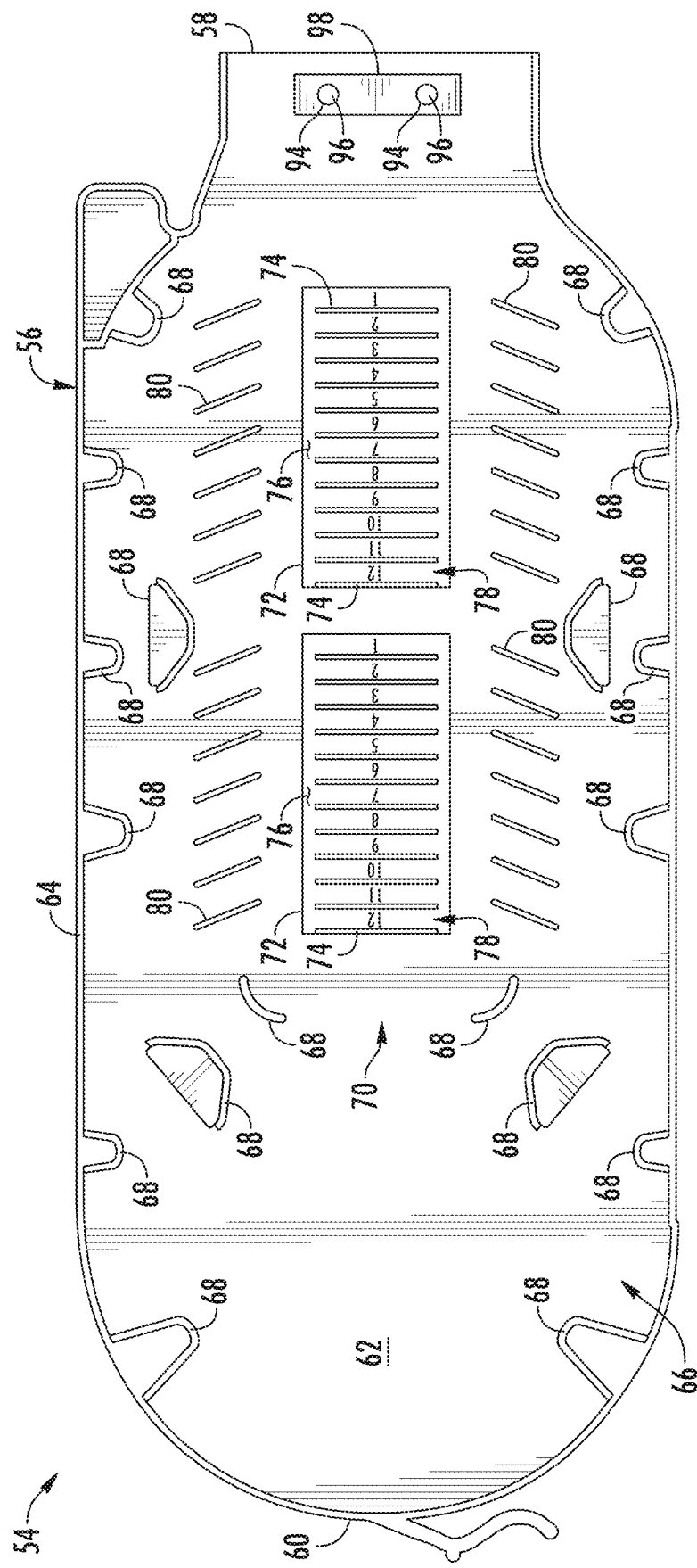
FIG. 9 is top-down view of a tray in accordance with another embodiment of the disclosure.

To this end, an alternative embodiment of a tray 54 in accordance with an aspect of the disclosure is illustrated in FIG. 9 and includes an oblong body 56 having a first, inlet end 58 and a second, closed end 60 ("distal end 60"). The inlet end 58 is configured to receive optical fibers 24 from the trunk cable 20 and optical fibers 36 from the indoor cables 34 that are configured to be connected within the tray 54. In one embodiment, the inlet end 58 may be generally tapered such that the inlet end 58 has a width that is less than the width of more distal portions of the body 56, as illustrated in FIG. 9. Other configurations, however, are possible. The distal end 60 helps contain the optical fibers 24, 36 within the tray 54, and in one embodiment may be generally arcuate in shape. Again, other configurations are possible.

The tray body 56 defines a base wall 62 and one or more peripheral side walls 64 that collectively define an interior cavity 66 for holding the optical fibers 24, 36. The cavity 66 and/or walls 62, 64 include a number of organizing and guide elements 68. These may take the form of various flaps, arched walls, bosses, etc. and facilitate the routing of optical fibers in the tray 54. Such elements 68 are generally known in the art. The base wall 62 includes a connection region 70 where the optical fibers 24 from the trunk cable 20 and the optical fibers 36 from the indoor cables 34 are optically connected together in a manner more fully described below.

The connection region 70 includes one or more generally rectangular connection plates 72 attached to the base wall 62, such as by bonding, fasteners, etc., and extending in a generally longitudinal direction of the tray 54. In the exemplary embodiment shown in FIG. 9, the connection region 70 of the tray 54 may include two such connection plates 72 having a small gap therebetween. It should be realized that the connection region 70 may include more or less connection plates 72 in various alternative embodiments. Each connection plate 72 further includes a plurality of spaced-apart support walls 74 extending away from an upper surface 76 of the connection plate 72, such as in a perpendicular arrangement. The spaces adjacent to or between support walls 74 define open-ended bays 78 for receiving the pre-terminated ends of the optical fibers 24, 36 of the trunk cable 20 and the indoor cables 34, respectively. The bays 78 are shown as being numbered in FIG. 9. As shown in this figure, each connection plate 72 may include twelve support walls 74 and twelve corresponding bays 78 for making an optical connection. It should be appreciated, however, that there may be more or less support walls 74/bays 78 in various alternative embodiments.

To facilitate the routing of optical fibers 24, 36 into the bays 78 of the connection plates 72, the tray 54 may further include a plurality of guide walls 80 extending from the base wall 62 adjacent the side edges of the connection plates 72. The number of guide walls 80 on each side of the connection plates 72 may generally relate to the number of support walls 74 and bays 78 associated with the connection plates 72 (e.g., one guide wall 80 for every two support walls 74). Thus, in an exemplary embodiment and as illustrated in FIG. 9, the tray 54 may include seven guide walls 80 on both sides of the connection plates 72. Again, this number may vary. The guide walls 80 may further be angled relative to the support walls 74 depending on, for example, how the optical fibers 24, 36 are organized within the tray 54. In one embodiment, the guide walls 80 are inclined (e.g., angled upwardly in FIG. 9 toward distal end 60) relative to the support walls 74. It should be recognized, however, that other orientations of the guide walls 80 are possible to support the routing of the optical fibers 24, 36 (or ribbons 28, 38) into the bays 78 on the connection plates 72.

In accordance with an aspect of the disclosure, the optical fibers 24, 36 that are routed to the tray 54 may be secured to the tray 54, and more particularly to the inlet end 58 of the tray 54, in an improved manner. The optical fibers 24, 36 are typically brought into the tray 54 in some form of "cable" arrangement and not as individual optical fibers (or individual groups of optical fibers). In other words, the optical fibers 24, 36 are typically carried in an outer protective sheath. For example, the optical fibers 24 of the trunk cable 20 may be routed to a tray 54 in the form of a subunit 22 (including its subunit jacket 30; see FIG. 4). Similarly, the optical fibers 36 may be routed to the tray 54 in the form of an indoor cable 34 having its outer protective sheath 40. Thus, the subunit 22 and the indoor cable 34 represent respective "cable" arrangements of the individual optical fibers 24, 36. In accordance with this aspect of the disclosure, the subunit 22 and the indoor cable 34 may be coupled to the inlet end 58 of the tray 54.

Figure 10:
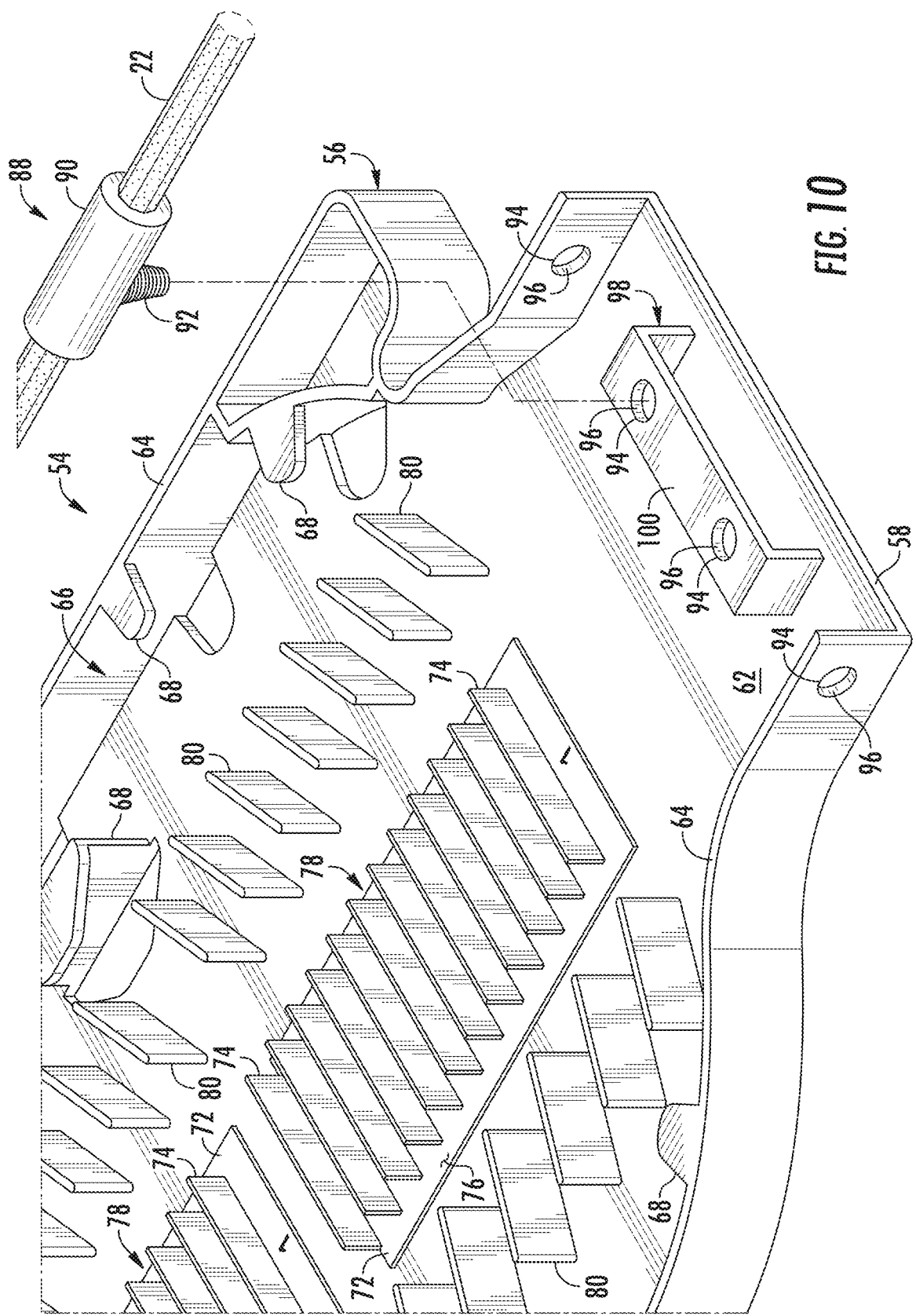
FIG. 10 is an enlarged perspective view of a front portion of the tray shown in FIG. 9.

As illustrated in FIG. 10, any subunit 22 of the trunk cable 20 may include a pre-assembled tray mount 88 adjacent the pre-terminated end of the subunit 22 for coupling the subunit 22 to a respective tray 54. The indoor cable 34 to be associated with the subunit 22 may likewise include a pre-assembled tray mount 88 adjacent a terminated end thereof (e.g., see the indoor cable 34 in FIG. 11). Thus, although FIG. 10 will be described primarily with reference to the subunit 22 that is shown, the aspects relating to the tray mount 88 may equally apply to an indoor cable 34.

The tray mount 88 is configured to be incorporated with the subunit 22 in a factory setting and thereby benefit from high-quality and repeatable processes. In other words, by "pre-assembled" it is meant that the tray mount 88 is coupled to the subunit 22 (or indoor cable 34) prior to the trunk cable 20 being sent out into the field for installation in the local fiber optic network 16. For example, the tray mounts 88 may be coupled to the subunits 22 during the manufacture of the trunk cable 20. In an exemplary embodiment, the tray mount 88 includes: a) a collar 90 configured to be disposed about the subunit jacket 30 of the subunit 22 (or protective sheath 40 of the indoor cable 34), and b) a connecting element 92 coupled to the collar 90 and generally extending therefrom. The connecting element 92 is configured to engage with a tray mount receiver 94 on the tray 54, as discussed in more detail below.

In one embodiment, the collar 90 may be generally ring-shaped or tubular and may be fitted over the end of the subunit 22 or indoor cable 34, such as prior to the fiber optic ribbons 28, 38 being terminated. Subsequently, the collar 90 may be secured to the subunit jacket 30 of the subunit 22 or the outer protective sheath 40 of the indoor cable 34, such as by bonding or other fastening methods. For example, in an exemplary embodiment, the collar 90 may be secured to the subunit 22/indoor cable 34 by heat shrink material. In an alternative embodiment, the collar 90 may have a split design (not shown) that allows the collar 90 to be positioned over the subunit 22/indoor cable 34 by passing the subunit 22/indoor cable 34 through a slot in the collar 90. The collars 90 on the subunits 22 of the trunk cable 20 and preferably on the indoor cables 34 may be positioned in pre-determined locations relative to the terminated ends of the subunits 22/indoor cables 34 based on, for example, the desired length of optical fiber 24, 36 (e.g., ribbons 28, 38) within the trays 54.

As mentioned above, the connecting element 92 extends outwardly from the collar 90 and is configured to engage with a tray mount receiver 94 on the tray 54. Thus, the connecting element 92 defines an interface for cooperating with the tray mount receiver 94. The connecting element 92 may take a wide variety of forms including various clips, buttons, hooks, posts, or other snap-on fasteners that allow the subunit 22/indoor cable 34 to quickly but securely connect to the tray 54. The connecting element 92 may be rigid or may be resilient. Furthermore, the connecting element 92 may be configured to couple to and release from the tray 54 multiple times (i.e., not a single-use connection). By way of example, this may be achieved through push/pull forces being imposed on the collar 90.

As described above, the subunit 22 and the indoor cable 34 may be secured to the tray 54 at the inlet end 58 thereof. Accordingly, the tray 54 may include one or more tray mount receivers 94 adjacent the inlet end 58 of the tray 54 for making a positive connection with the tray mounts 88. Similar to the above, the tray mount receiver 94 may take a wide variety of forms including various clips, buttons, hooks, posts, or other snap-on fasteners that are configured to cooperate with the tray mounts 88 on the subunits 22/indoor cables 34. In an exemplary embodiment, the tray mount receivers 94 may include one or more apertures 96 adjacent the inlet end 58 of the distribution tray 54. By way of example and without limitation, the tray 54 may include a U-shaped bracket 98 adjacent the inlet end 58 having an upper wall 100 spaced from the base wall 62 of the tray 54. The upper wall 100 may include one or more apertures 96 (or another form of the tray mount receiver 94) disposed therein for receiving a tray mount 88.

In an exemplary embodiment, the bracket 98 may include two tray mount receivers 94, one for the tray mount 88 of the subunit 22 and one for the tray mount 88 of the indoor cable 34. Of course, the bracket 98 may include additional tray mount receivers 94. The bracket 98 is configured to receive the tray mount 88 in a manner that prevents a portion of the tray mount 88 from extending beyond the base wall 62 when coupled to a tray mount receiver 94. This prevents or limits the number of catch or snag points associated with the tray 54. Furthermore, the inlet end 58 of the tray 54 may include additional tray mount receivers 92. For example, and as illustrated in FIG. 10, the side wall 64 of the tray 54 adjacent the inlet end 58 may include tray mount receivers 94, such as apertures 96, for receiving tray mounts 88 on the subunit 22 and/or the indoor cable 34. The tray mount receivers 94 on the side walls 64 may have an orientation different than the orientation of the tray mount receivers 94 in the bracket 98.

Figure 11:
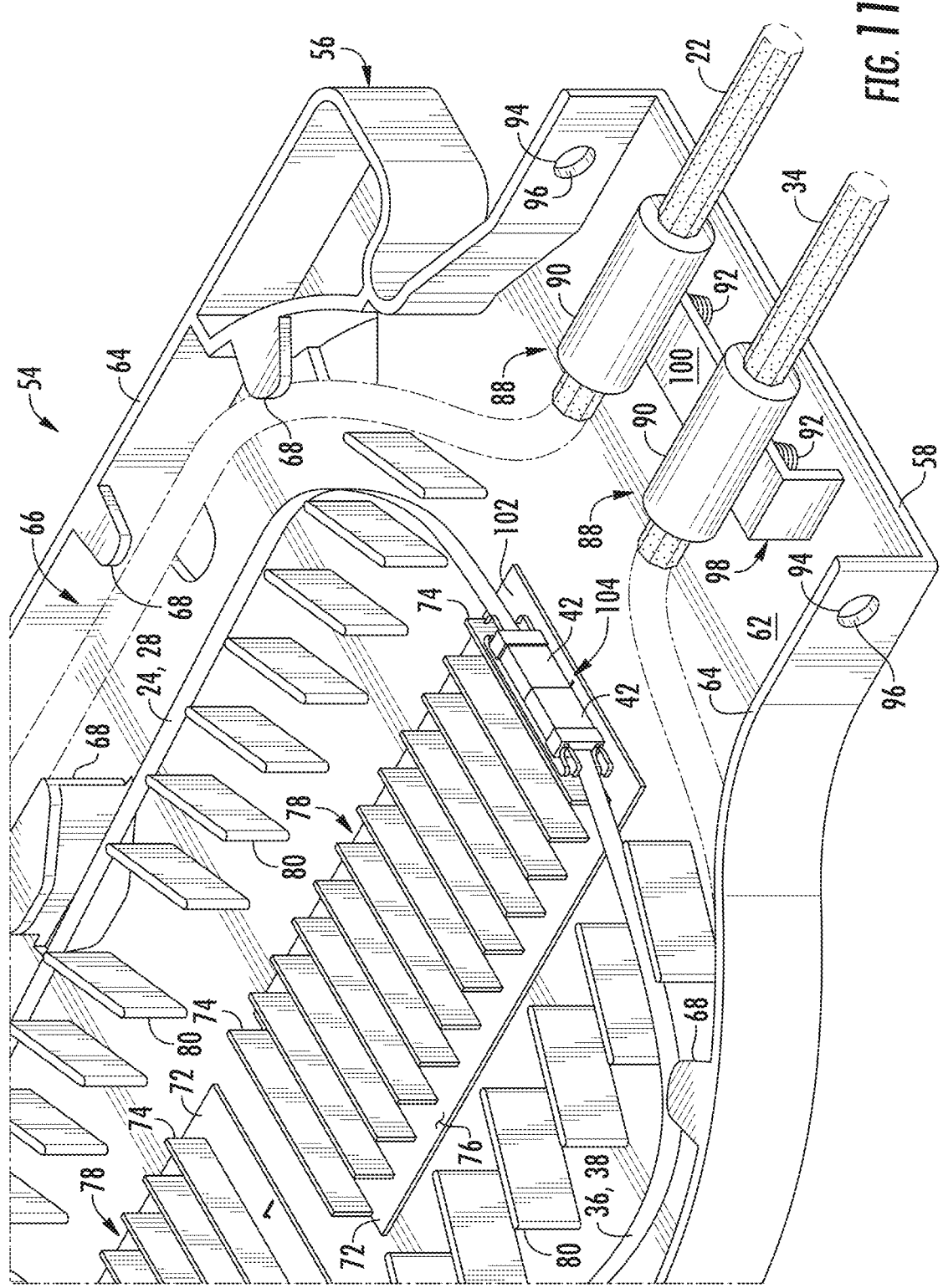
FIG. 11 is another enlarged perspective view of a front portion of the tray shown in FIG. 9.

Prior to installation of the local fiber optic network 16 at the data center 10, the subunits 22 of the trunk cable 20 are pre-terminated with the connection interfaces (e.g., ferrules, connectors, etc.) and include pre-assembled tray mounts 88. The indoor cables 34 may similarly be pre-terminated with connection interfaces (e.g., ferrules, connectors, etc.) and include pre-assembled tray mounts 88 as well. During installation, and as described above, the subunits 22 of the trunk cable 20 and the indoor cables 34 are routed to the distribution cabinet 32 in one of the buildings (e.g., the main building 12 or one of the auxiliary buildings 14) of the data center 10. For example, the trunk cable 20 is routed through conduit extending between buildings of the data center 10. A field technician will then select one of the subunits 22 of the trunk cable 20 and an indoor cable 34 for connection in a select one of the trays 54 housed in the cabinet 32. As shown in FIGS. 10 and 11, the initial steps for carrying out this connection may include removing the selected tray 54 from the tray housing 196 (FIG. 7) in the cabinet 32, locating the pre-assembled tray mounts 88 on the selected subunit 22 and the selected indoor cable 34, and engaging the tray mounts 88 on the subunit 22 and indoor cable 34 to respective tray mount receivers 94 adjacent the inlet end 58 of the tray 54. For example, the projecting portion of the connecting element 92 may be inserted through an aperture 96 in the bracket 98 or side wall 64 on the tray 54. The optical fibers 24, 36 generally, and the fiber optic ribbons 28, 38 more specifically, may be distributed and organized within the interior cavity 66 of the tray 54 by the guide elements 68. The connection interfaces (e.g., ferrules 42) may then be directed toward the connection region 70 to make an optical connection between the optical fibers 24 of the subunit 22 and the optical fibers 36 of the indoor cables 34, as will now be described in more detail.

FIG. 11 illustrates the optical fibers 24, 36 of the subunit 22 and indoor cable 34, respectively, arranged in ribbons 28, 38 that are each terminated with a ferrule 42, such as an MT ferrule, as their associated connection interface. The subunit 22 may therefore correspond to one of the subunits 22 of the pre-terminated trunk cable 110 (FIG. 4). As noted above, each ribbon 28, 38 may include twelve optical fibers, and each ferrule 42 may terminate one or two of the ribbons 28, 38 (and thereby be configured to couple to twelve or twenty-four optical fibers). After the ribbons 28, 38 are distributed within the tray 54, individual ribbons 28, 38 may be directed toward respective bays 78 in the connection region 70 of the tray 54. From the perspective of FIGS. 9-11, the ribbons 28 from the subunit 22 may generally be arranged along the right side of the tray 54 and the ribbons 38 from the indoor cable 34 may generally be arranged along the left side of the tray 54. Other arrangements, however, may be possible.

Figure 12:
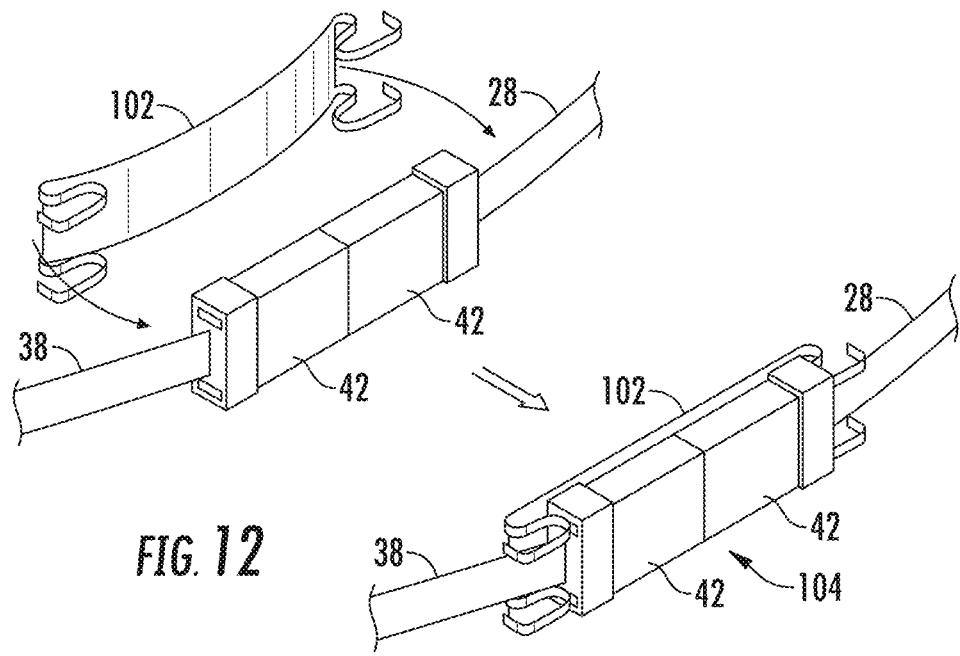
FIG. 12 is a perspective view of a connection joint between optical fibers of an indoor cable and optical fibers of a subunit of a trunk cable in accordance with an embodiment of the disclosure.

The ribbons 28, 38 of the subunit 22 and the indoor cable 34 directed to a particular bay 78 of the connection region 70 may be optically coupled by mating the ferrules 42 of the respective ribbons 28, 38 together. For example, in the exemplary embodiment described above, the ferrules 42 of the respective ribbons 28, 38 may be male/female and be mated together by a spring clip 102, as shown in FIG. 12. The spring clip 102 that creates a biasing force to maintain the ferrules 42 in mating engagement with each other. More specifically, the spring clip 102 is movable between an expanded position and a retracted position. In the expanded position, the spring clip 102 is configured to receive mated ferrules 42. By way of example and without limitation, a suitable tool (e.g., expander tool; not shown) may be provided for expanding the spring clip 102 and thereby allow the mated ferrules 42 to be disposed within the spring clip 102. Upon release of the tool, the spring clip 102 will move toward its retracted position under a spring bias where the spring clip 102 engages with the ferrules 42 to urge the mated ferrules 42 toward each other and resist movements of the ferrules 42 away from each other. For reasons set out below, in an exemplary embodiment, the spring clip 102 may be formed from a suitable metal, including by way of example iron, nickel, cobalt, and other ferromagnetic metals or alloys, such as steel. The mated ferrules 42 and the spring clip 102 collectively define a connection joint 104 between the ribbons 28, 38. And as can be appreciated, the spring clip 102 effectively serves as an adapter for establishing optical connections even though the ferrules 42 themselves may not be considered to be optical connectors.

Subsequent to the ferrules 42 being mated together and secured with the spring clip 102, the field technician may then secure the connection joint 104 to the tray 54, and more particularly secure the connection joint 104 to the selected bay 78 in the connection region 70 of the tray 54. In one particular aspect of this disclosure, the connection joint 104 may be secured within its selected bay 78 using magnetism. In one embodiment, at least one of the connection plate 72 or the rear support walls 74, and preferably both the connection plate 72 and the rear support walls 74 are formed from a magnetic material, such as a permanent magnetic material (e.g., rare earth metals). Accordingly, when the connection joint 104 is positioned in a respective bay 78, the spring clip 102 will magnetically attach to the connection plate 72 and/or the support wall 74 and thereby secure the connection joint 104 to the connection region 70 of the tray 54. The strength of the magnetic field may be selected to maintain the connection joint 104 engaged with the tray 54 during the normal course and usage of the trays 54 and cabinet 32.

It should be understood that the field technician may repeat the process described above for each of the ribbons 28, 38 of the subunit 22 and indoor cable 34, and until each of the bays 78 of the connection region 70 are occupied by a connection joint 104. Once the tray 54 is full, the field technician may re-insert the tray 54 on the tray housing 196 (FIG. 7) and select another tray 54 for forming optical connections in the manner described above. This process may continue until each of the trays 54 in the cabinet 32 have been processed. By way of example, the cabinet 32 may be configured to hold at least twelve trays 54, such that all of the subunits 22 of the trunk cable 20 may be coupled to respective indoor cables 34 within one cabinet 32. In one embodiment, for example, the cabinet 32 may include twenty-four trays 54 (e.g., to accommodate two trunk cables 20). However, the cabinet 32 may include more or less trays 54 in various alternative embodiments.

Figure 13:
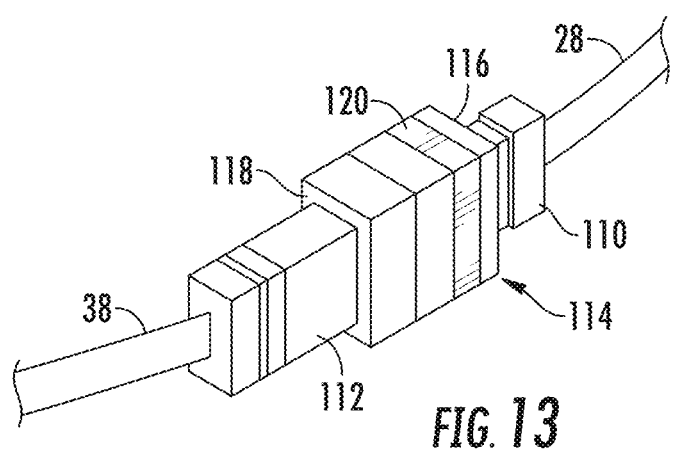
FIG. 13 is a perspective view of another connection joint between optical fibers of an indoor cable and optical fibers of a subunit of a trunk cable in accordance with an embodiment of the disclosure.

In the embodiment described above, the connection interfaces associated with the subunit 22 and the indoor cable 34 were described as each being ferrules 42 that were directly coupled together using the spring clips 102 to make the optical connection. Aspects of the disclosure, however, are not so limited. As mentioned above in connection with FIG. 8, the connection interfaces that are mated together may be in the form of multi-fiber optical connectors, such as MPO connectors (not shown). It was also mentioned above that connection interfaces of one cable (e.g., an indoor cable 34) may an MPO connector, while the connection interfaces associated with another cable (e.g., the trunk cable 20) may only be MT ferrules. FIG. 13 schematically illustrates such an embodiment.

As shown in FIG. 13, the ribbons 28 associated with the subunit 22 of the trunk cable 20 may be terminated with multi-fiber ferrules 110 (e.g., MT ferrules), and the ribbons 38 associated with the indoor cable 34 may be terminated with multi-fiber connectors 112 (e.g., MPO connectors). In such an embodiment, the respective ribbons 28, 38 of the subunit 22 and the indoor cable 34 may be optically coupled within a hybrid adapter 114, wherein the adapter 114 is configured to receive the multi-fiber ferrule 110 in a first end 116 of the adapter 114 and the multi-fiber connector 112 in a second end 118. The adapter 114 may include a metal portion or interface 120 in the form of a metal strip, plate, or band. The adapter 114 may then be magnetically secured within a bay 78 of the connection region 70 of the tray 54 in a manner similar to that described above.

Figure 14:
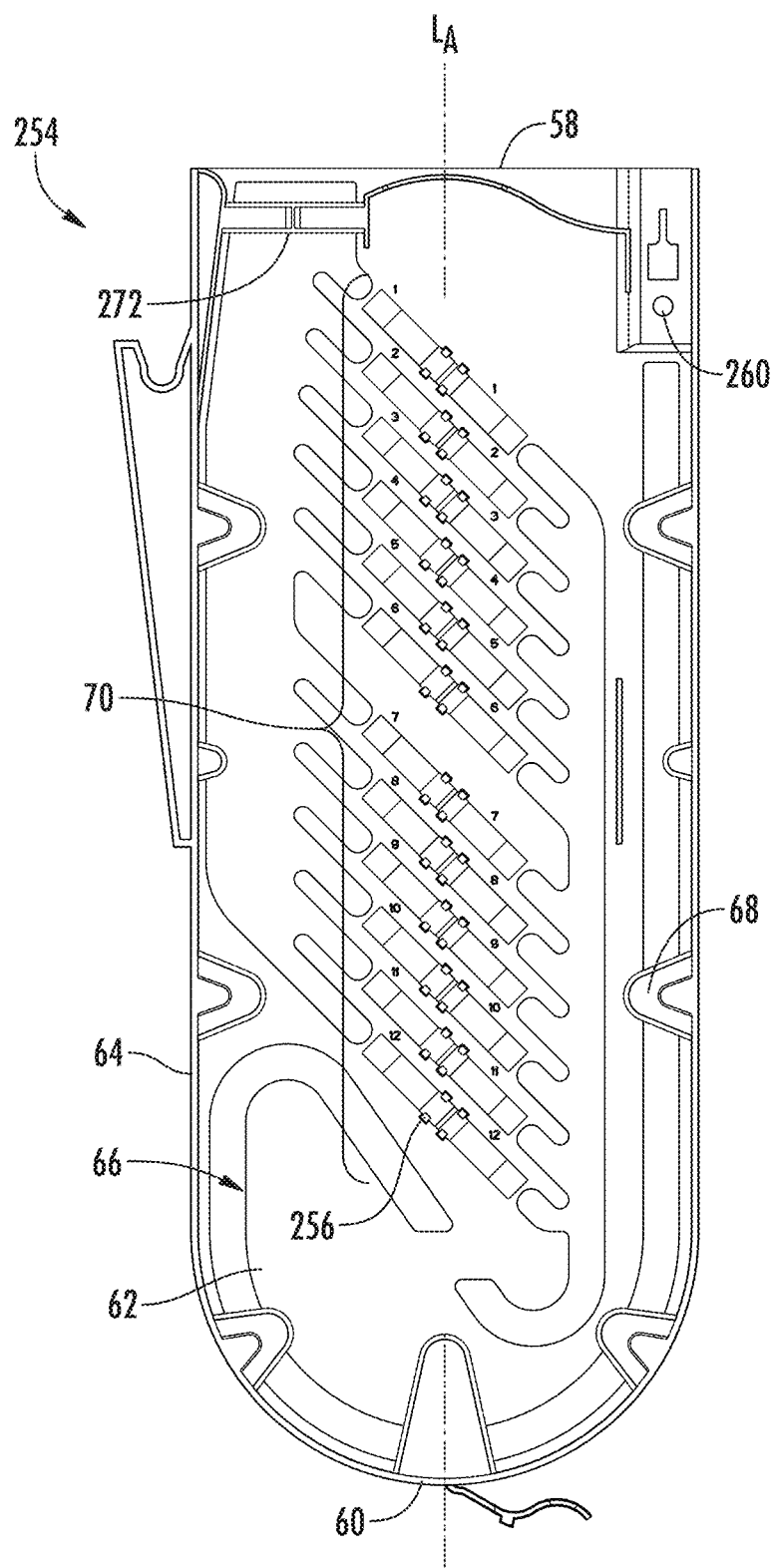
FIG. 14 is top-down view of a tray in accordance with another embodiment of the disclosure.
Figure 15:
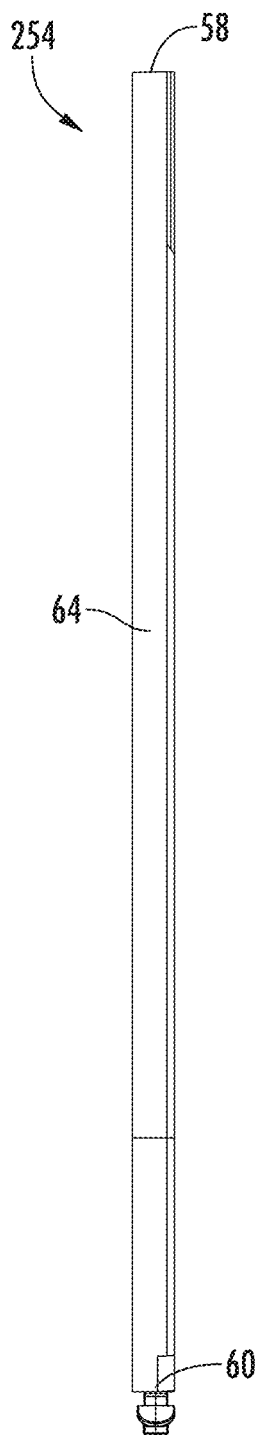
FIG. 15 is a side elevation view of the tray shown in FIG. 14.

An alternative embodiment of a distribution tray 254 ("tray 254") in accordance with aspects of the disclosure is illustrated in FIGS. 14 and 15. The tray 254 includes elements corresponding to those in the tray 54 such that the same reference numbers will be used where appropriate. To this end, the tray 254 includes an oblong body 56 having a first, inlet end 58 and a second, closed end 60 ("distal end 60"). The inlet end 58 is configured to receive optical fibers 24 from the trunk cable 20 and optical fibers 36 from the indoor cables 34 that are configured to be connected within the tray 54. The distal end 60 helps contain the optical fibers 24, 36 within the distribution tray 54, and in one embodiment may be generally arcuate in shape. Again, other configurations are possible.

The tray body 56 defines a base wall 62 and one or more peripheral side walls 64 that collectively define an interior cavity 66 for holding the optical fibers 24, 36. The cavity 66 and/or walls 62, 64 include a number of organizing and guide elements 68. These may take the form of various flaps, arched walls, bosses, etc. and facilitate the routing of optical fibers in the tray 254. Various markings may also be provided on the base wall 62 (e.g., by way of printing on the base wall 62 or applying decals to the base wall 62) to suggest routing patterns/arrangements for the optical fibers, as will be described in further detail below. Optical fibers are intended to be routed to a connection region 70, which where optical connections are intended to be established (e.g., the optical fibers 24 from the trunk cable 20 being optically connected to the optical fibers 36 from the indoor cables 34).

The connection region 70 in the embodiment of FIG. 14 includes a plurality of adapter receivers 256 configured to receive and couple/secure adapters 44 to the tray body 56. This can be better understood with reference to FIG. 16, which illustrates two of the adapter receivers 256 and an example adapter 44. As described above in connection with FIG. 8, the adapters 44 are in the form of MPO-type adapters such that connection interfaces on the cables intended to be mated using the adapters 44 (e.g., the trunk cable 20 and an indoor cable 34 in FIG. 1) may be MPO connectors (not shown). Each adapter receiver 256 in the embodiment shown is generally in the form of a pair of side walls or arms spaced apart from each other and extending upwardly from the base wall 62. The side walls or arms include respective detents/hooks 258. As can be appreciated from FIG. 16, the adapters 44 may be snapped into one of the adapter receivers 256 by hand (i.e., without tools), with the detents/hooks 258 ultimately serving to retain the adapters 44 on the tray body 56. The same is true with respect to removing the adapters 44 from the tray body 56. That is, the adapters 44 may be removable by hand (i.e., without tools).

The adapter receivers 256 are shaped to hold the adapters 44 on their sides. More specifically, each adapter 44 has a generally rectangular profile where a major dimension extending between two sides of the adapter 44 is longer than a minor dimension extending between a top and bottom of the adapter 44. The major dimension is generally associated with a width of the adapter 44, whereas the minor dimension is generally associated with a height of the adapter 44. The adapter receivers 256 are shaped so that, when an adapter 44 is received in an adapter receiver 256, one of the sides of the adapter 44 faces the base wall 62 of the tray body 56. The major dimension of the adapter 44 is oriented vertically, perpendicular to the base wall 62. The minor dimension of the adapter 44 is oriented horizontally, parallel to the base wall 62, meaning that the adapters 44 can be placed closer together on the tray body 56. This helps reduce the size of the connection region 70 (FIG. 14) so that there can be more room on the tray body 56 for routing optical fibers without increasing the size of the tray body 56.

Referring back to FIG. 14, it can be seen how the tray 254 has a longitudinal axis $L_A$ between the inlet end 58 and the distal end 60. The adapter receivers 256 are distributed in a direction along the longitudinal axis $L_A$ of the tray 254. Thus, the adapters 44 (FIG. 16) are ultimately disposed on the tray body 56 in the same manner (i.e., in a direction along the longitudinal axis $L_A$ of the tray 256). The adapter receivers 256 are also configured so that the adapters 44 are disposed at an angle relative to the longitudinal axis $L_A$. Referring to both FIGS. 14 and 16, each adapter includes a first opening 45, a second opening 47 opposite the first opening 45, and an optical or central axis $O_A$ extending between the first and second openings 45, 47. When the adapters 44 are coupled to the tray 254, the optical axis $O_A$ of each adapter 44 is angled about 45 degrees relative to the longitudinal axis $L_A$ of the tray 256. In other embodiments, the optical axis $O_A$ of any adapter 44 may be at a different angle relative to the longitudinal axis $L_A$, such as between about 30 degrees and about 60 degrees. All of the adapters 44 may be angled in the same manner or in different manners. The non-perpendicular orientation of the optical axes $O_A$ of an adapter 44 relative to the longitudinal axis $L_A$ of the tray 256 may facilitate routing of optical fibers 24, 36, as will be described in greater detail below.

As shown in FIG. 14, the tray 256 also includes at least one tray mount receiver 260 in a first corner region of the inlet end 58. The tray mount receiver 260 is configured to cooperate with a tray mount 262 (FIGS. 17-19) for the same reasons as the previous embodiment, i.e. to couple a subunit 22 to the tray 254. In this embodiment, the tray mount 262 may be assembled onto the subunit 22 in the field during installation interconnect system described above. Thus, whereas the example described above in connection with FIGS. 9-11 involved the tray mounts 88 being pre-assembled with subunits 22 of the trunk cable 20, in this example the tray mounts 262 are "post-assembled" with the subunits 22. It will be appreciated that either approach may be possible in some embodiments. Indeed, in this disclosure, general references to tray mounts being "assembled" with cables (or portions thereof, e.g. subunits) contemplate pre-assembled tray mounts and post-assembled tray mounts. The example involving post-assembly with the tray mount 262 will now be described in further detail.

Figure 19:
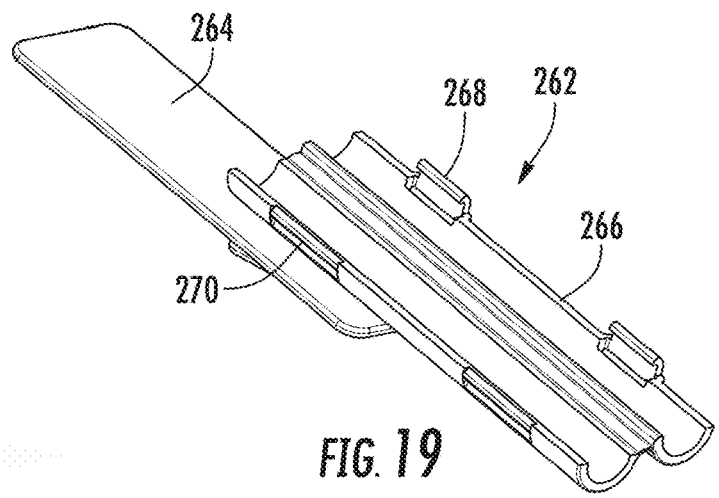
FIG. 19 is similar to FIG. 18, but illustrates the tray mount in an open position.

As shown in FIGS. 17-19, the tray mount 262 includes a base 264 that defines the interface for cooperating with the tray mount receiver 260. The tray mount 262 also includes and a guide member 266 for receiving and directing optical fibers. The guide member 266 in the embodiment shown is in the form of a clamshell tube. FIG. 18 illustrates the guide member 266 in a closed position, while FIG. 19 illustrates the guide member 266 in an open position. Thus, the guide member 266 is movable between a closed position and an open position. At least one fastener 268 is provided in the embodiment shown to selectively retain the guide member 266 in the closed position. Specifically, the embodiment shown includes the fastener 268 in the form of a hook or latch that engages a corresponding latching feature 270 when the guide member 266 is moved into the closed position. The engagement may be releasable by a technician when it is desired to move the guide member 266 back to the open position. Other embodiments may involve guide members having a different arrangement/structure, including embodiments of guide members that do not need to move between open and closed positions to receive optical fibers.

Figure 20:
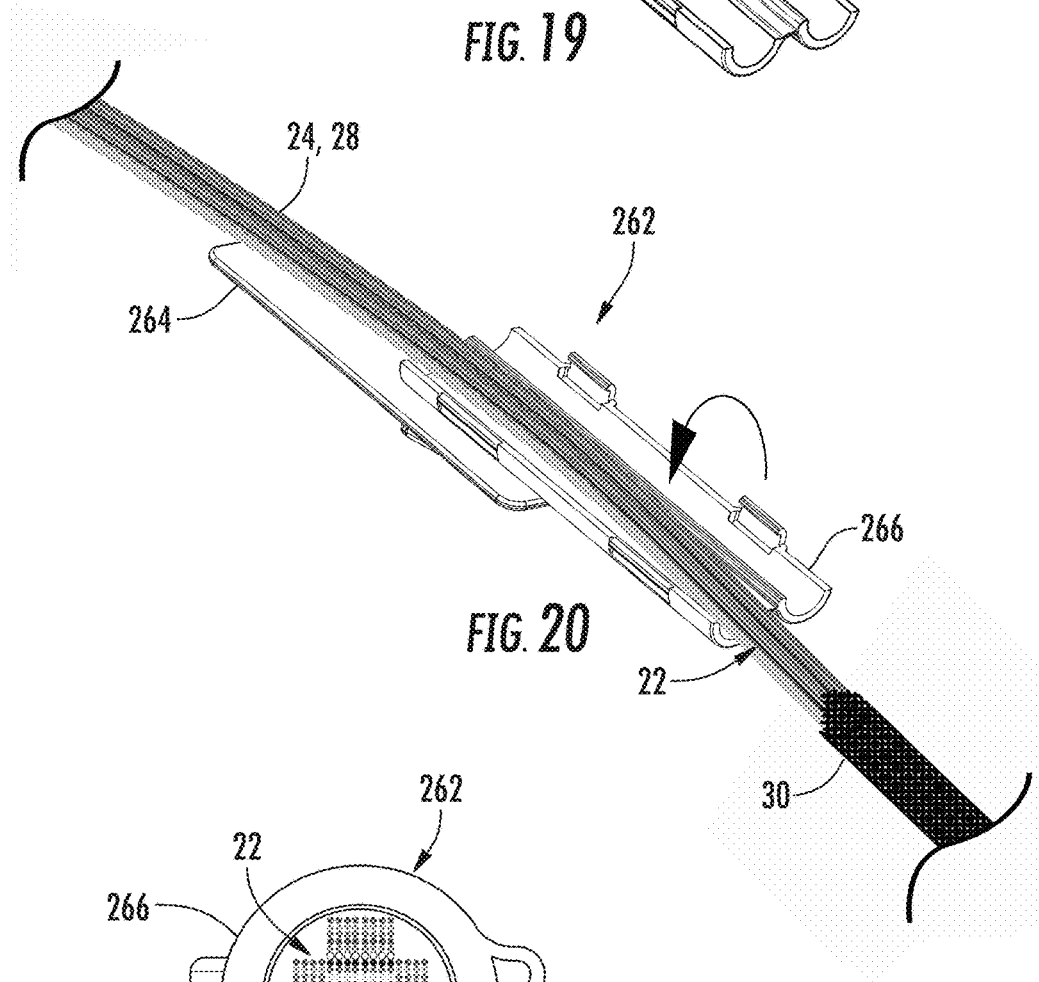
FIG. 20 is a top perspective view illustrating a subunit being received in the tray mount when the tray mount is in the open position.
Figure 21:
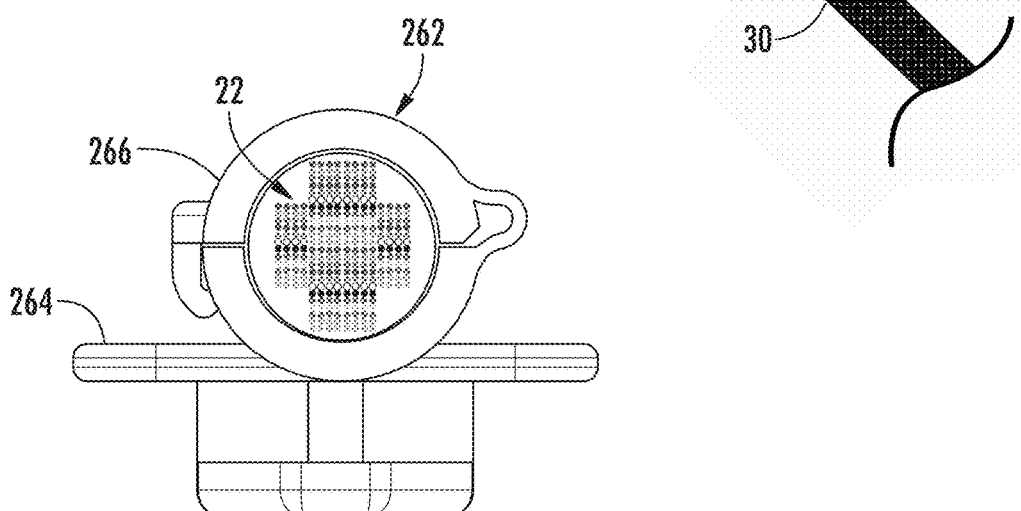
FIG. 21 is a schematic end view of the optical fibers of a subunit extending in the tray mount of FIG. 17 when the tray mount is in a closed position.

FIG. 20 illustrates the optical fibers 24 of a subunit 22 being positioned in the guide member 266 when the guide member 266 is in the open position. The end of the subunit jacket 30 is spaced from the guide member 266 such that it is the exposed ribbons 28 being placed in the guide member 266. In alternative embodiments, the guide member 266 may receive optical fibers in a cabled form (i.e., carried within a protective sheath/jacket). As schematically shown in FIG. 21, the guide member 266 may be closed to circumferentially contain the optical fibers 24/ribbons 28. The guide member 266 therefore protects the portions of the optical fibers 24/ribbons 28 upon which the guide member 266 is received. And even though the optical fibers 24/ribbons 28 may be loosely contained in the guide member 266, the closed nature of the guide member 266 effectively couples the tray mount 262 to the subunit 22.

Once the tray mount 262 is assembled on the subunit 22, the tray mount 262 may be secured to the tray mount receiver 260. This may not require any tools, as the interface defined by the base 264 of the tray mount 262 may be configured to be snapped into or otherwise selectively engaged with the tray mount receiver 260 by hand. Thus, with the tray mount 262 coupled to the subunit 22 and selectively engaged with the tray mount receiver 260, the tray mount 262 couples the subunit to the tray 254. The optical fibers 24/ribbons 28 can then be routed in the tray 254 to establish interconnections.

Figure 22:
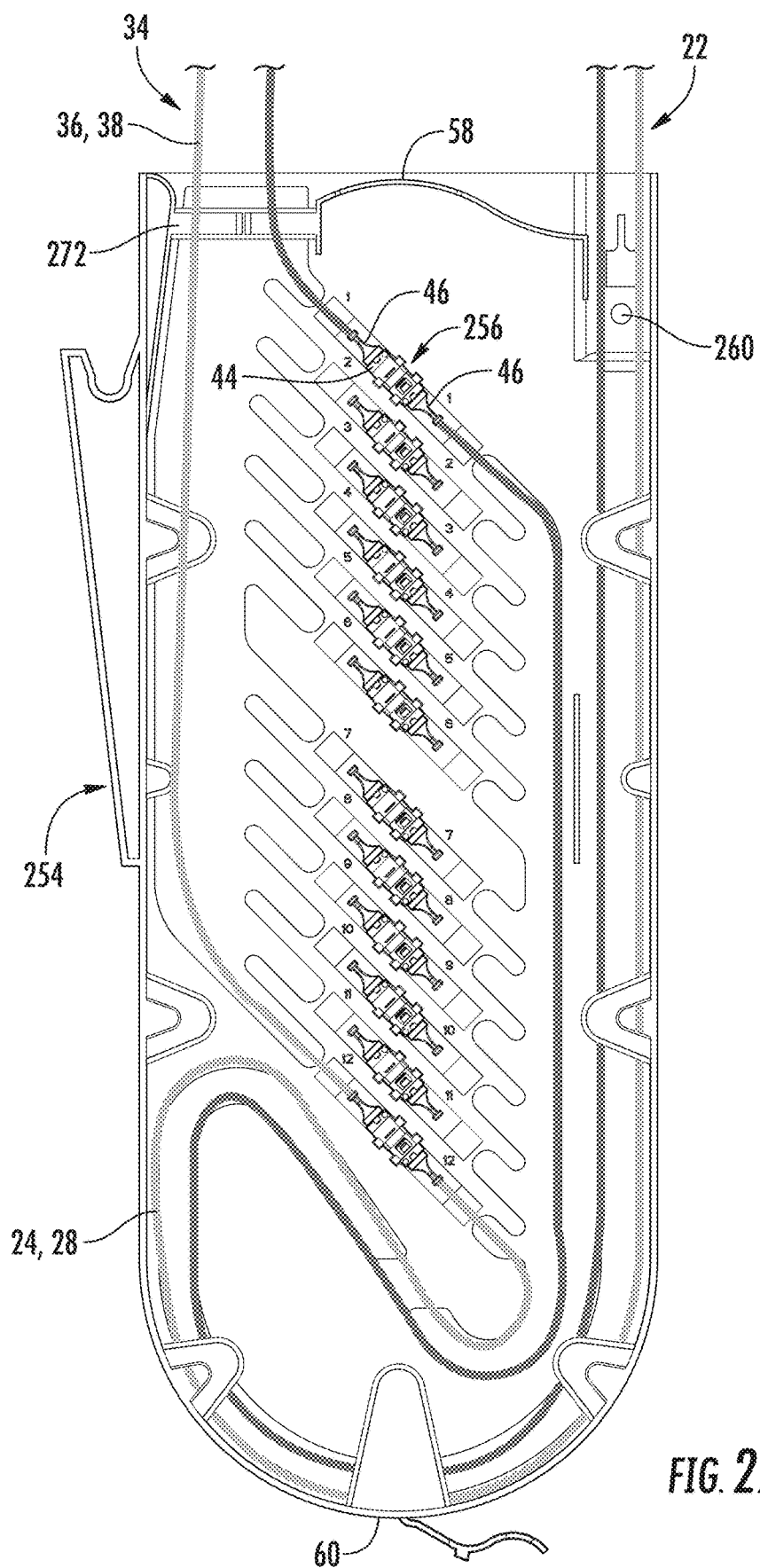
FIG. 22 is a perspective view of the tray of FIG. 14, schematically illustrating the tray being used to establish interconnections between optical fibers of a subunit and optical fibers of an indoor cable.

To this end, FIG. 22 schematically illustrates one of the trays 254 being used to establish interconnections between a subunit 22 of the trunk cable 20 and one of the indoor cables 34. The adapters 44 are shown as being positioned in the adapter receivers 256. For convenience given the schematic nature of the figure, the dust plugs 46 are still shown and the connection interfaces of the trunk cable 20 and indoor cable 24 are not shown. Additionally, the tray mounts 262 (FIGS. 17-21) are not shown. FIG. 22 intended to illustrate routing patterns rather than the details of the connection joints or details of securing cables to the tray 254. To this end, as shown in FIG. 22, the optical fibers 24 of the subunit 22 extend from the inlet end 58 to the distal end 60, curve at the distal end 60 so as to extend back toward the inlet end 58, form a loop to extend back toward the distal end 60, and then curve back toward the inlet end 58 before extending to a corresponding adapter 44. The angled orientation of the adapters 44 helps limit the amount the optical fibers 24 must further bend as they extend to the corresponding adapter 44, thereby helping the optical fibers 24 avoid a bend radius that might otherwise cause unacceptable attenuation or damage. The angled orientation of that adapters 44 also helps limit the amount the optical fibers 36 of the indoor cable 34 bend before exiting the tray 254. A routing clip 272 may be provided at the inlet end 58 in a second corner region opposite the tray mount receiver 260 to assist with routing/organizing the optical fibers 36.

In the various examples described above, the pre-termination of the trunk cables 20 and the indoor cables 34 with connection interfaces, in combination with the relatively easy and quick mating of the connection interfaces, significantly decreases the time and cost associated with interconnecting the main building 12 and the auxiliary building(s) 14 of the data center 10. This provides a distinctive advantage in the design and construction of large-scale data centers 10. Additionally, and as described above, the subunits 22 of the trunk cables 20 and the indoor cables 34 may have an assembled tray mount (e.g., pre-assembled tray mount 88 or post-assembled tray mount 262) for attaching the subunits 22 and indoor cables 34 to tray mount receivers on the trays. The attachment afforded by the tray mounts/tray mount receivers provides a positive connection with the trays without any significant degradation in the optical signals carried by the optical fibers 24, 36 of the subunits 22 and indoor cables 34. The tray mounts may also help protect the optical fibers where they enter the tray.

The are many other alternatives and variations that will be appreciated by persons skilled in optical connectivity without departing from the spirit or scope of this disclosure. This includes combining or substituting features from the various example embodiments in this disclosure. For example, the tray 254 (FIG. 14) may alternatively be configured to include bays for receiving spring clips (similar to the tray 54; FIGS. 9-11) instead of having the adapter receivers 256 for receiving the adapters 44. And instead of a routing clip 272 to assist with routing/organizing the optical fibers 36 of the indoor cables 34, the tray 254 may include additional tray mount receivers 260 so that the tray mounts 262 can also be used for the indoor cables 34 (similar to the tray 54 and its tray mount receivers 94). Conversely, the tray 54 may alternatively be configured to have the same configuration of tray mount receivers as the tray 254. Again, these and other variations are understood as being part of this disclosure by persons skilled in optical connectivity. The invention should be construed to include everything within the scope of the claims below and their equivalents.

What is claimed is:

1. A system for managing connections for optical fibers that extend from a cable, the system comprising:
   a tray that includes a body having at least one tray mount receiver; and
   a tray mount comprising a base that defines an interface for cooperating with the at least one tray mount receiver, wherein the tray mount also comprises a clamshell tube configured to receive the optical fibers, wherein the clamshell tube is movable between an open position and a closed position, and wherein the tray mount is configured couple the optical fibers to the tray without additional tools.

2. The system of claim 1, wherein the body of the tray further includes a base wall, one or more peripheral side walls that collectively define an interior cavity, an inlet end that has the at least one tray mount receiver, a distal end opposite the inlet end, and a connection region between the inlet end and the distal end.

3. The system of claim 2, wherein the at least one tray mount receiver is located in a first corner region of the inlet end of the body of the tray.

4. The system of claim 3, wherein the tray further includes a routing clip in a second corner region of the inlet end that is opposite the at least one tray mount receiver.

5. The system of claim 2, wherein the tray further comprises:
   a plurality of adapters disposed on the body, wherein the plurality of adapters are located within the interior cavity and over the connection region and are arranged adjacent to each other in a direction along a longitudinal axis that extends between the inlet end and the distal end of the body.

6. The system of claim 5, wherein each adapter of the plurality of adapters includes a first opening, a second opening opposite the first opening, and an optical axis extending between the first opening and the second opening, and wherein the optical axis is non-perpendicular to the longitudinal axis of the tray.

7. The system of claim 5, wherein each adapter of the plurality of adapters includes a first opening, a second opening opposite the first opening, and an optical axis extending between the first opening and the second opening, and wherein the optical axis is angled between 30-60 degrees relative to the longitudinal axis of the tray.

8. The system of claim 5, wherein each adapter of the plurality of adapters includes a first opening, a second opening opposite the first opening, and an optical axis extending between the first opening and the second opening, and wherein the optical axis is angled about 45 degrees relative to the longitudinal axis of the tray.

9. A system for managing connections for optical fibers that extend from a cable, the system comprising:
   a cabinet for receiving the end of the cable;
   a plurality of trays disposed within the cabinet, wherein each tray of the plurality of trays includes a body having at least one tray mount receiver; and
   a plurality of tray mounts each comprising a base that defines an interface for cooperating with the at least one tray mount receiver, wherein each tray mount of the plurality of tray mounts also comprises a clamshell tube configured to receive some of the optical fibers, wherein the clamshell tube is movable between an open position and a closed position, and wherein each tray mount of the plurality of tray mounts is configured couple some of the optical fibers to the tray without additional tools.

10. The system of claim 9, wherein for each tray of the plurality of trays the body further includes a base wall, one or more peripheral side walls that collectively define an interior cavity, an inlet end that has the at least one tray mount receiver, a distal end opposite the inlet end, and a connection region between the inlet end and the distal end.

11. The system of claim 10, wherein for each tray of the plurality of trays the at least one tray mount receiver is located in a first corner region of the inlet end of the body of the tray.

12. The system of claim 11, wherein for each tray of the plurality of trays the tray further includes a routing clip in a second corner region of the inlet end that is opposite the at least one tray mount receiver.

13. The system of claim 10, wherein each tray of the plurality of trays further comprises:
   a plurality of adapters disposed on the body, wherein the plurality of adapters are located within the interior cavity and over the connection region and are arranged adjacent to each other in a direction along a longitudinal axis that extends between the inlet end and the distal end of the body.

14. The system of claim 13, wherein each adapter of the plurality of adapters includes a first opening, a second opening opposite the first opening, and an optical axis extending between the first opening and the second opening, and wherein the optical axis is non-perpendicular to the longitudinal axis of the tray on which the adapter is disposed.

15. The system of claim 13, wherein each adapter of the plurality of adapters includes a first opening, a second opening opposite the first opening, and an optical axis extending between the first opening and the second opening, and wherein the optical axis is angled between 30-60 degrees relative to the longitudinal axis of the tray on which the adapter is disposed.

16. The system of claim 13, wherein each adapter of the plurality of adapters includes a first opening, a second opening opposite the first opening, and an optical axis extending between the first opening and the second opening, and wherein the optical axis is angled about 45 degrees relative to the longitudinal axis of the tray on which the adapter is disposed.

17. A method of managing connections for optical fibers that extend from a cable, the method comprising:
 routing some of the optical fibers to a tray that includes a body having at least one tray mount receiver;
 assembling a tray mount onto at least some of the optical fibers, wherein the tray mount comprises a base that defines an interface for cooperating with the at least one tray mount receiver, and wherein the assembling comprises:
  receiving the at least some of the optical fibers in a clamshell tube of the tray mount when the clamshell tube is in an open position; and
  moving the clamshell tube to a closed position; and
 using the tray mount to couple the at least some of the optical fibers to the tray without additional tools.

18. The method of claim 17, wherein the at least some of the optical fibers are not covered by a jacket when received in the clamshell tube.

\* \* \* \* \*